US012343740B2

(12) United States Patent
Quinn

(10) Patent No.: US 12,343,740 B2
(45) Date of Patent: Jul. 1, 2025

(54) SHOWERHEAD WITH TURBINE DRIVEN SHUTTER

(71) Applicant: WATER PIK, INC., Fort Collins, CO (US)

(72) Inventor: Michael J. Quinn, Fort Collins, CO (US)

(73) Assignee: Water Pik, Inc., CO (US)

( * ) Notice: Subject to any disclaimer, the term of this patent is extended or adjusted under 35 U.S.C. 154(b) by 398 days.

(21) Appl. No.: 17/945,589

(22) Filed: Sep. 15, 2022

(65) Prior Publication Data

US 2023/0101877 A1 Mar. 30, 2023

Related U.S. Application Data

(60) Provisional application No. 63/250,938, filed on Sep. 30, 2021.

(51) Int. Cl.

*B05B 1/16* (2006.01)
*B05B 1/18* (2006.01)
*B05B 3/04* (2006.01)

(52) U.S. Cl.

CPC .......... *B05B 1/1654* (2013.01); *B05B 1/1663* (2013.01); *B05B 1/169* (2013.01); *B05B 1/185* (2013.01); *B05B 3/04* (2013.01)

(58) Field of Classification Search

CPC ......... B05B 1/08; B05B 1/083; B05B 1/1636; B05B 1/1654; B05B 1/1663; B05B 1/169; B05B 1/18; B05B 1/185; B05B 1/34; B05B 1/3405; B05B 1/341; B05B 1/3421; B05B 1/3426; B05B 3/04

See application file for complete search history.

(56) References Cited

U.S. PATENT DOCUMENTS

| | | | | |
|---|---|---|---|---|
| 8,915,455 | B2 * | 12/2014 | Zhou | B05B 1/18 239/443 |
| 9,404,243 | B2 | 8/2016 | Cacka et al. | |
| D842,431 | S | 3/2019 | Cacka et al. | |
| 10,265,710 | B2 | 4/2019 | Cacka et al. | |
| D855,757 | S | 8/2019 | Cacka et al. | |
| 10,478,837 | B2 | 11/2019 | Cacka et al. | |
| 10,525,488 | B2 | 1/2020 | Cacka et al. | |
| 10,994,289 | B2 | 5/2021 | Cacka et al. | |
| 11,084,047 | B2 | 8/2021 | Cacka et al. | |
| 11,173,502 | B2 | 11/2021 | Cacka et al. | |
| D950,011 | S | 4/2022 | Cacka et al. | |
| D960,294 | S | 8/2022 | Cacka et al. | |
| 2019/0143348 | A1 * | 5/2019 | Quinn | B05B 1/1636 239/562 |
| 2021/0129162 | A1 * | 5/2021 | Quinn | B05B 1/18 |
| 2022/0032326 | A1 | 2/2022 | Cacka et al. | |
| 2023/0089835 | A1 * | 3/2023 | Peterson | B05B 3/16 239/428.5 |

* cited by examiner

*Primary Examiner* — Darren W Gorman

(57) ABSTRACT

A showerhead is disclosed including a first nozzle, a second nozzle, and a massage mode assembly in fluid communication with a fluid inlet, the first nozzle and the second nozzle. The massage mode assembly includes a turbine, a cam coupled to the turbine defining a dwell edge that extends between a leading corner and a follower corner, and a shutter movably coupled to the cam, where movement of the turbine causes the cam to drive shutter between a first position covering the first nozzle and opening the second nozzle and a second position opening the first nozzle and covering the second nozzle.

8 Claims, 23 Drawing Sheets

SHOWERHEAD WITH TURBINE DRIVEN SHUTTER

CROSS REFERENCE TO RELATED APPLICATIONS

The present application claims priority under 35 U.S.C. § 119(e) to U.S. provisional patent application No. 63/250,938, titled "Showerhead with Turbine Driven Shutter," filed Sep. 30, 2021, which is hereby incorporated by reference herein in its entirety.

The present application incorporates by reference U.S. Pat. No. 10,994,289, titled "Showerhead with Turbine Driven Shutter," filed on Dec. 2, 2019 and U.S. patent application Ser. No. 16/597,050 titled "Showerhead with plurality of modes," filed on Oct. 9, 2019 both of which claim priority to U.S. Pat. No. 10,525,488, filed on Mar. 27, 2018, titled "Showerhead with Engine Release Assembly," which is a divisional application of U.S. Pat. No. 10,478,837, filed on Jul. 12, 2016, which is a divisional application of U.S. Pat. No. 9,404,243, filed on Jun. 13, 2014, titled "Showerhead with Turbine Driven Shutter," which claims priority under 35 U.S.C. § 119(e) to U.S. Provisional Patent Application No. 61/834,816, filed on Jun. 13, 2013, titled "Showerhead with Turbine Drive Shutter," the disclosures of all of which are incorporated by reference herein in their entireties for all purposes.

TECHNICAL FIELD

The technology disclosed herein relates generally to showerheads, and more specifically to pulsating showerheads.

BACKGROUND

Showers provide an alternative to bathing in a bathtub. Generally, showerheads are used to direct water from the home water supply onto a user for personal hygiene purposes.

In the past, bathing was the overwhelmingly popular choice for personal cleansing. However, in recent years showers have become increasingly popular for several reasons. First, showers generally take less time than baths. Second, showers generally use significantly less water than baths. Third, shower stalls and bathtubs with showerheads are typically easier to maintain. Fourth, showers tend to cause less soap scum build-up. Fifth, by showering, a bather does not sit in dirty water—the dirty water is constantly rinsed away.

With the increase in popularity of showers has come an increase in showerhead designs and showerhead manufacturers. Many showerheads emit pulsating streams of water in a so-called "massage" mode. Other showerheads are referred to as "drenching" showerheads, since they have relatively large faceplates and emit water in a steady, soft spray pattern. In some instances, conventional massage mode pulses may not be as forceful as a consumer desires, especially as water flow rates may be reduced (e.g., due to water consumption regulations). As such, there may be a need for a showerhead with an improved massage mode.

The information included in this Background section of the specification, including any references cited herein and any description or discussion thereof, is included for technical reference purposes only and is not to be regarded subject matter by which the scope of the invention is to be bound.

SUMMARY

A showerhead per the disclosure herein has a water-powered turbine, a cam, and a shutter. The shutter is connected to the turbine and the cam so as to oscillate across groups of nozzle outlet holes in a massaging showerhead.

Another embodiment includes an apparatus including a turbine attached to a cam, where the turbine is operatively connected to two or more shutters through links. Movement of the turbine causes the shutters to oscillate across groups of nozzle outlet holes.

Yet another embodiment includes a showerhead including a housing defining a chamber in fluid communication with a fluid inlet such as a water source, a first bank of nozzles, and a second bank of nozzles. The showerhead also includes a massage mode assembly that is at least partially received within the chamber. The massage mode assembly includes a turbine, a cam connected to or formed integrally with the turbine, and a shutter connected to the cam. With the structure of the massage mode assembly, the movement of the shutter is restricted along a single axis such that as the turbine rotates, the cam causes the shutter to alternatingly fluidly connect and disconnect the first bank of nozzles and the second bank of nozzles from the fluid inlet.

Another embodiment of the present disclosure includes a method for producing a massaging spray mode for a showerhead. The method includes fluidly connecting a first plurality of nozzles to a fluid source, where each of the nozzles within the first plurality of nozzles are opened substantially simultaneously and fluidly disconnecting the first plurality of nozzles form the fluid source, where each of the nozzles in the first plurality of nozzles are closed substantially simultaneously.

Yet another embodiment of the present disclosure includes a showerhead having a spray head, an engine, and a face plate. The engine is fluidly connected to a water source and is received within the spray head. The engine may include a massage mode assembly that has a turbine and a shoe connected to the turbine, where the movement of the shoe is restricted to a single axis. As the turbine rotates, the shoe alternating fluidly connects and disconnects a first set of nozzle apertures and a second set of nozzle apertures, where each nozzle within the specific set is open and closed at substantially the same time. Additionally, the face plate is connected to the engine and is configured to selectively rotate the engine, in order to vary the spray characteristics of the showerhead.

In one embodiment, a showerhead is disclosed that includes a first nozzle, a second nozzle, and a massage mode assembly in fluid communication with a fluid inlet, the first nozzle, and the second nozzle. The massage mode assembly includes a turbine, a cam coupled to the turbine defining a dwell edge that extends between a leading corner and a follower corner, and a shutter movably coupled to the cam, where movement of the turbine causes the cam to drive the shutter between a first position covering the nozzle and opening the second nozzle and a second position opening the first nozzle and covering the second nozzle.

In another embodiment, a massage mode assembly for a showerhead is disclosed. The massage mode assembly includes a turbine, a shutter, and a cam coupled to the turbine and the shutter. The cam includes a tri-lobe surface for coupling to the shutter, where movement of the turbine causes the cam to rotate, causing the shutter to move between a first position and a second position.

In yet another embodiment, a method for generating a massaging spray for a showerhead is disclosed. The method includes engaging a wall of a shutter to initiate movement of the shutter within a massage mode chamber from a first position to a second position, engaging the wall of the shutter to complete movement of the shutter within the massage mode chamber to the second position, retaining the shutter in the second position for at least 10 degrees of rotation of a turbine coupled to the shutter and configured to move the shutter within the massage mode chamber; and releasing the shutter from the second position.

Additional features are set forth in part in the description that follows and will become apparent to those skilled in the art upon examination of the specification and drawings or may be learned by the practice of the disclosed subject matter. A further understanding of the nature and advantages of the present disclosure may be realized by reference to the remaining portions of the specification and the drawings, which forms a part of this disclosure.

One of skill in the art will understand that each of the various aspects and features of the disclosure may advantageously be used separately in some instances, or in combination with other aspects and features of the disclosure in other instances. Accordingly, individual aspects can be claimed separately or in combination with other aspects and features. Thus, the present disclosure is merely exemplary in nature and is in no way intended to limit the claimed invention or its applications or uses. It is to be understood that structural and/or logical changes may be made without departing from the spirit and scope of the present disclosure.

The present disclosure is set forth in various levels of detail and no limitation as to the scope of the claimed subject matter is intended by either the inclusion or non-inclusion of elements, components, or the like in this summary. In certain instances, details that are not necessary for an understanding of the disclosure or that render other details difficult to perceive may have been omitted. Moreover, for the purposes of clarity, detailed descriptions of certain features will not be discussed when they would be apparent to those with skill in the art so as not to obscure the description of the present disclosure. The claimed subject matter is not necessarily limited to the arrangements illustrated herein, with the scope of the present disclosure is defined only by the appended claims.

BRIEF DESCRIPTION OF THE DRAWINGS

The description will be more fully understood with reference to the following figures in which components may not be drawn to scale, which are presented as various embodiments of a showerhead described herein and should not be construed as a complete depiction of the scope of the showerhead.

Embodiments of the invention and their advantages are best understood by referring to the detailed description that follows. It should be appreciated that like reference numerals are used to identify like elements illustrated in one or more of the figures.

DETAILED DESCRIPTION

Figure 1A:
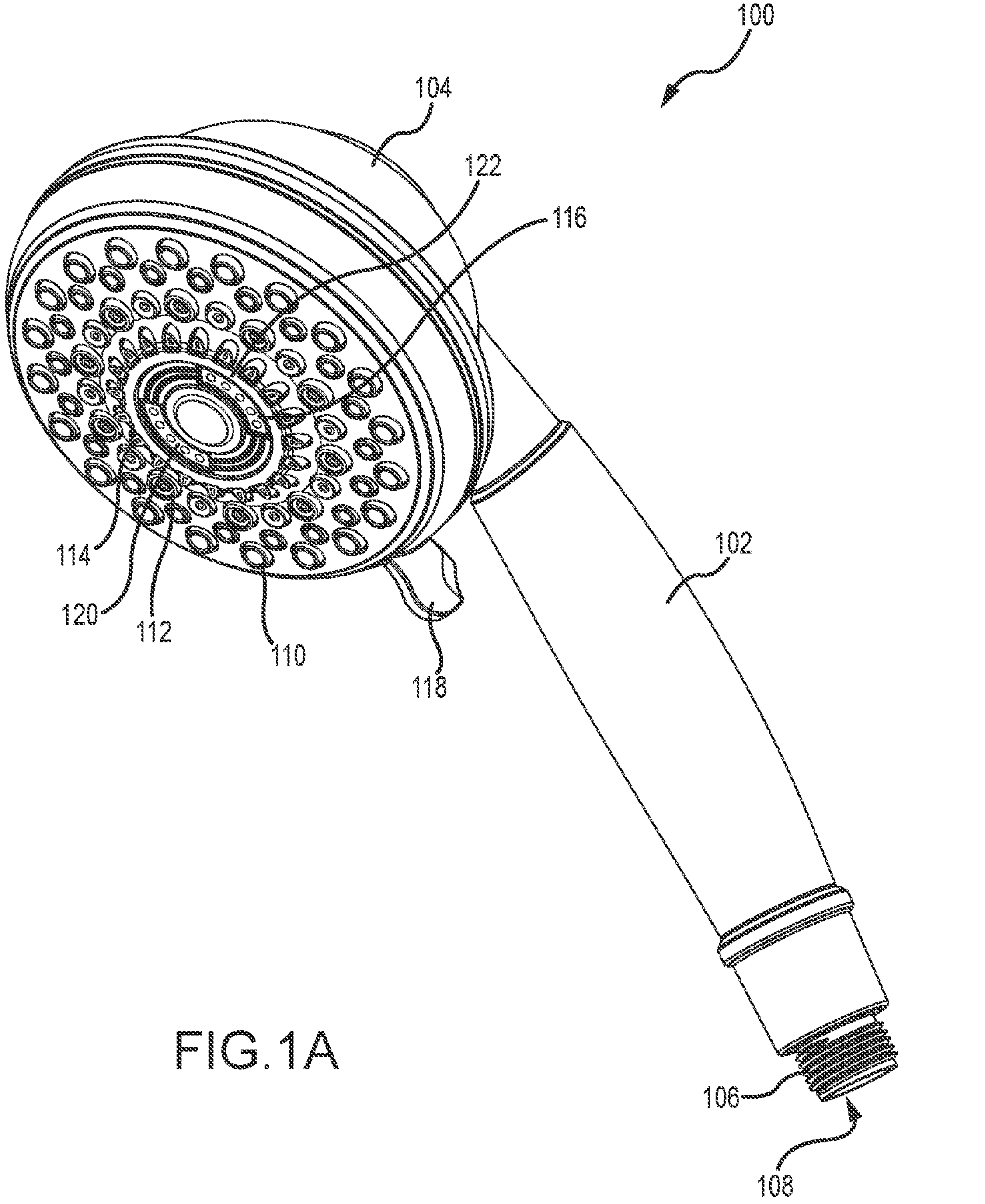
FIG. 1A is an isometric view of a showerhead including a massage mode assembly.

This disclosure is related to a showerhead including a pulsating or massaging spray. The showerhead may include a massage mode assembly including a jet disk, a turbine, a shutter, and a housing. The massage mode assembly is used to create the pulsating or intermittent spray. In one embodiment, the turbine defines one or more cams or cam surfaces and the shutter, which may be restrained in certain directions, follows the movement of the cam to create the pulsating effect by selectively blocking and unblocking outlet nozzles.

In operation, water flowing through the showerhead causes the turbine to spin and, as the turbine spins, the cam rotates causing the shutter to oscillate. In examples where the shutter movement is constrained in one or more directions, the shutter may move in a reciprocal motion, such as a back and forth motion, rather than a continuous motion. The reciprocal motion allows a first group of nozzles to be covered by the shutter, while a second group of nozzle is uncovered and, as the shutter reciprocates, the shutter moves to close the second group of nozzles at the same time that the first group of nozzles is opened. In many embodiments the nozzles in both groups may not be open or "on" at the same time. In particular, nozzles from a first nozzle group may be closed while nozzles from the second group are open and vice versa. As such, the showerhead may not include a set of "transitional" nozzles, i.e., nozzle groups in which the nozzles in a group progressively open and close such as due to a rotating shutter.

The binary functionality of the massage mode or pulsating mode allows the showerhead to produce a stronger fluid force during the pulsating mode, allowing the user to experience a more intense "massage" mode, even with lower fluid flow rates. In some instances the pulse mode may be 50% more forceful than the pulse mode of conventional "progressive" pulse showerheads. Thus, the showerhead may be able to conserve more water than conventional showerheads, while avoiding a decrease in force performance, and in fact may allow a user to experience a greater force during the massage mode.

In some embodiments, a pulsating showerhead spray may be formed by an oscillating shutter. The shutter may be configured to oscillate past the openings of discreet sets of spray nozzles. As an example, the shutter may be actuated by one or more eccentric cams attached to, or formed integrally with, the water driven turbine. These elements include one or more shutters operating in an oscillatory fashion, a turbine with one or multiple cams, and two or more individual groups of water outlet nozzles. Other embodiments may also include links between the cam(s) and shutter(s).

In some embodiments, to increase a massage intensity, such as to compensate for reduced water flow rates and/or to enhance a user experience, the massage mode assembly may include a cam with two or more discrete edges or corners (as opposed to the circular or continuous edge cam). In these instances, one edge of the cam may be configured as a dwell or retaining edge which acts to help retain the shutter in a first position even as the cam continues to rotate. The dwell edge may define a dwell time where the shutter "pauses" in a first position or a second position to increase the time one or more nozzles are open and closed, respectively, which increases the stream velocity of water exiting the nozzles, increasing the force. In this manner, the massage pulse may be more intense and the pulses may be more "distinct" or identifiable by the user as compared to the continuous edge cam.

In some instances, the cam may be configured as a tri-lobe or three edged cam with at least two distinct edges and/or one or more corners. In these instances, one lobe or edge may be configured to initiate movement of the shutter and a second lobe or edge may be configured to maintain the position of the shutter. Additionally, a corner, such as a leading corner, may act to complete movement of the shutter into the first position or the second position.

Figure 1B:
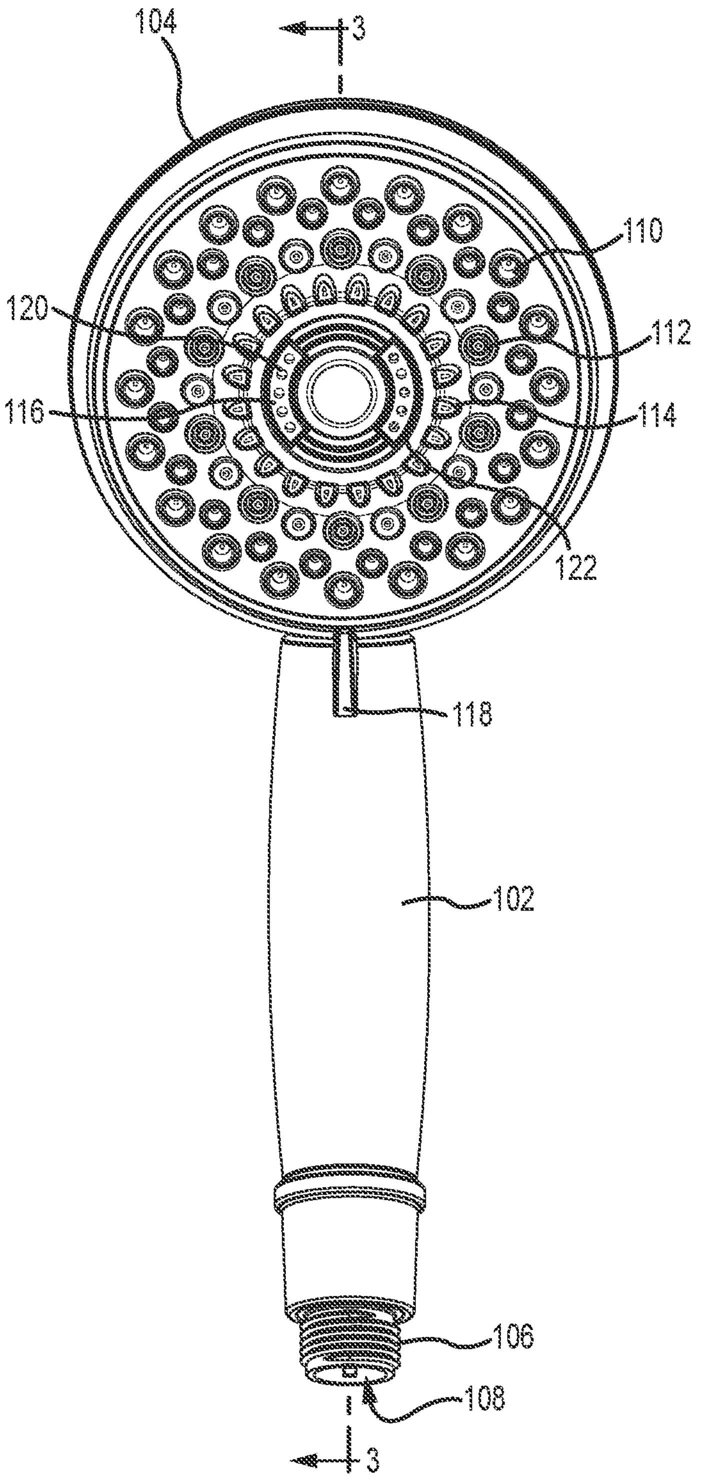
FIG. 1B is a front elevation view of the showerhead of FIG. 1A.
Figure 2:
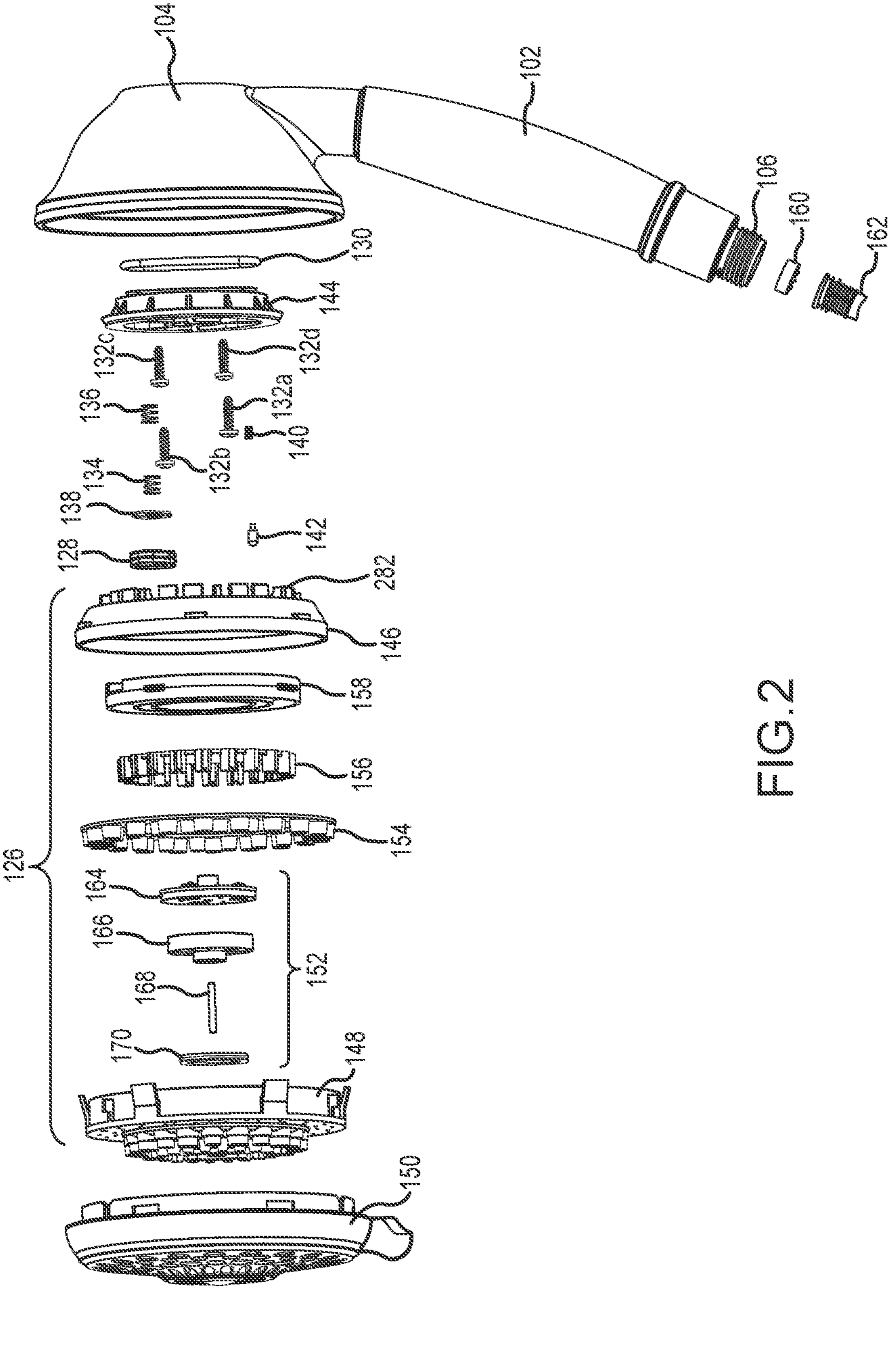
FIG. 2 is an exploded view of the showerhead of FIG. 1A.
Figure 3:
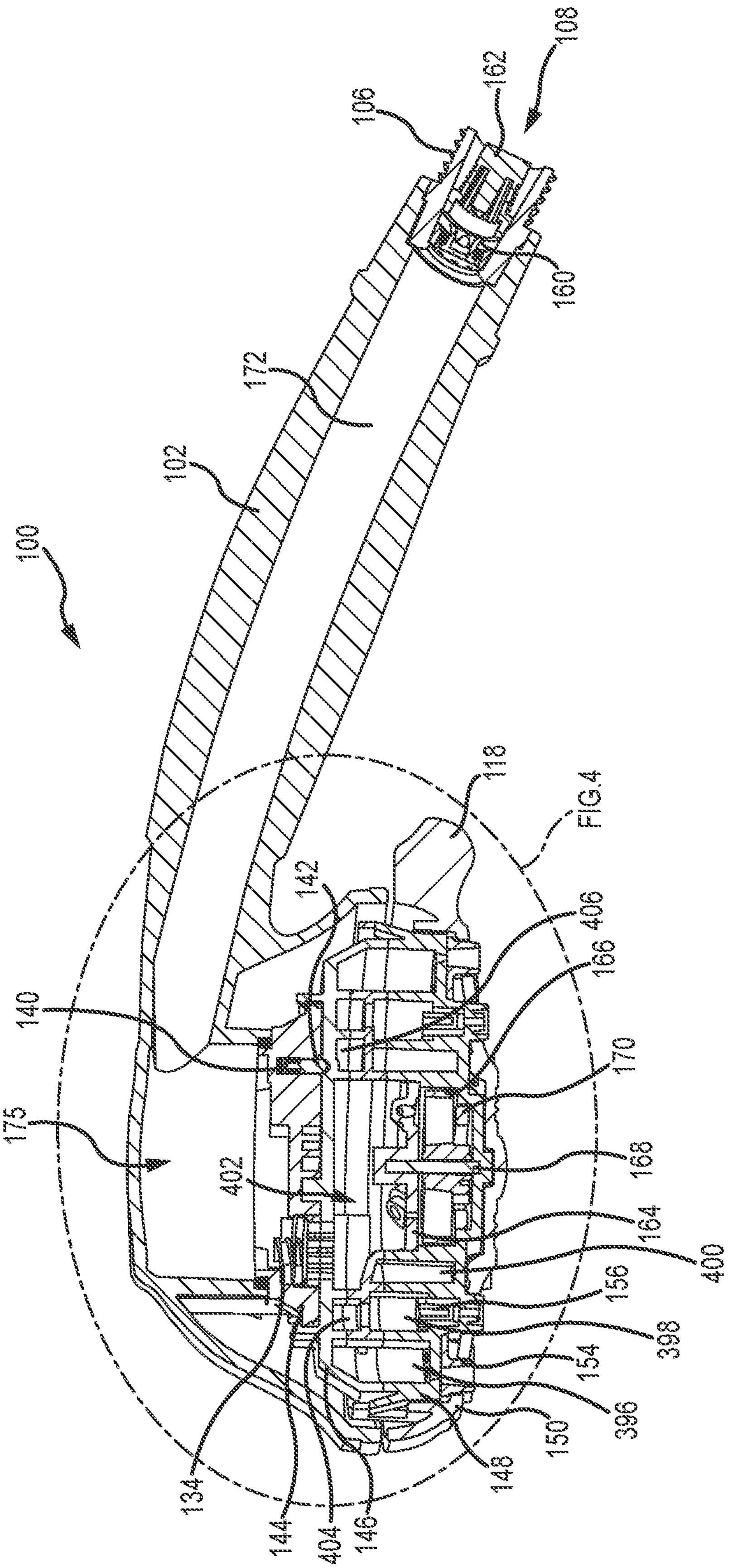
FIG. 3 is a cross-sectional view of the showerhead of FIG. 1A taken along line 3-3 in FIG. 1B.
Figure 4:
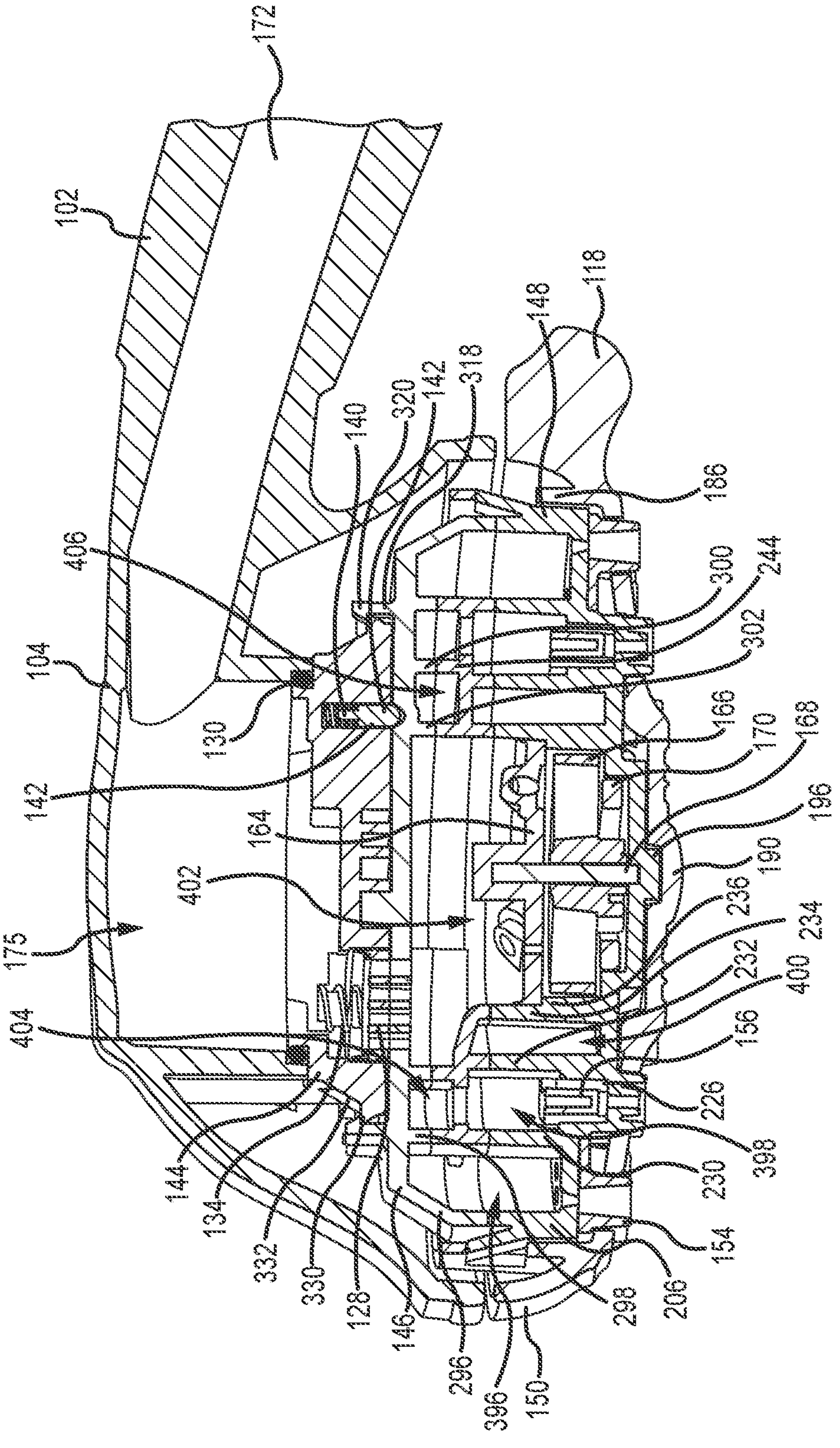
FIG. 4 is an enlarged cross-sectional view of a portion of the showerhead of FIG. 1A as indicated in FIG. 3.

Turning to the figures, showerhead embodiments of the present disclosure will now be discussed in more detail. FIGS. 1A and 1B are various views of the showerhead. FIG. 2 is an exploded view of the showerhead of FIG. 1A. FIGS. 3 and 4 are cross-section views of the showerhead of FIG. 1A. With reference to FIGS. 1A-2, the showerhead 100 may include a handle 102 and a spray head 104. In the embodiment shown in FIGS. 1A-2, the showerhead 100 is a handheld showerhead. However, in other embodiments (see, e.g., FIG. 23), the showerhead 100 may be a fixed or wall mount showerhead, in which case the handle 102 may be omitted or reduced in size. The handle 102 defines an inlet 108 for the showerhead 100 that receives water from a fluid source, such as a hose, J-pipe, or the like. Depending on the water source, the handle 102 may include threading 106 or another connection mechanism that can be used to secure the handle 102 to the hose, pipe, etc.

In embodiments where the showerhead 100 is a handheld showerhead, the handle 102 may be an elongated member having a generally circular cross section or otherwise be configured to be comfortably held in a user's hand. Additionally, as shown in FIG. 2, the showerhead 100 may also include a flow regulator 160 and a filter 162 that are connected to the handle 102.

With reference to FIGS. 1A and 1B, the spray head 104 includes a plurality of output nozzles arranged in sets or groups, e.g., a first nozzle group 110, a second nozzle group 112, a third nozzle group 114, and a fourth nozzle group 116, that function as outlets for the showerhead 100. As will be discussed in more detail below, each of the selected nozzle groups 110, 112, 114, 116 may be associated with a different mode for the showerhead 100. Additionally, certain groups of nozzles, such as the fourth nozzle group 116 may include nozzle subsets such as a first nozzle bank 120 and a second nozzle bank 122. In this example, the two nozzle banks 120, 122 may be crescent shaped, include five nozzles, and may be positioned opposite one another. However, the example shown in FIGS. 1A and 1B is meant as illustrative only and many other embodiments are envisioned. For example, the nozzle banks 120, 122 may be arranged as one or more nozzles in parallel lines or other arrangements. The showerhead mode is varied by rotating the mode selector 118, which in turn rotates an engine 126 received within the spray head 104, which will be discussed in more detail below.

Figure 5:
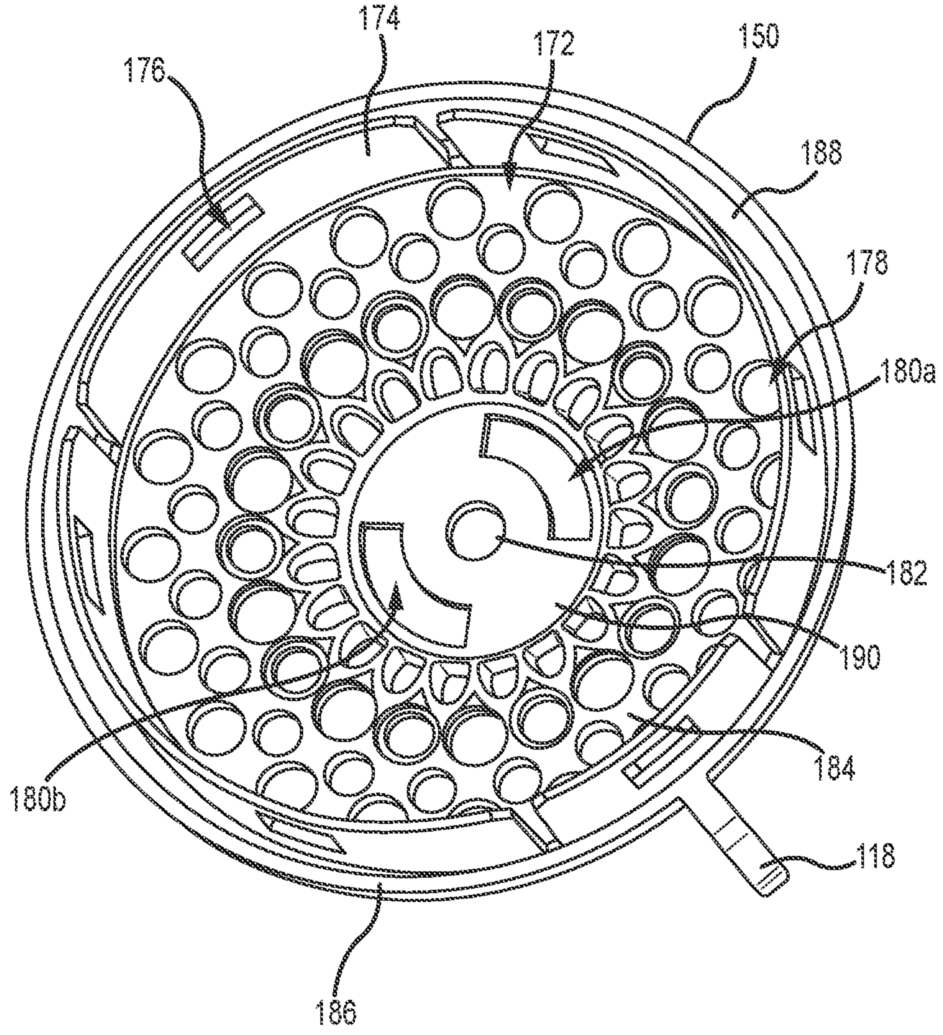
FIG. 5 is a rear isometric view of a cover plate for the showerhead.

With reference to FIG. 2, the showerhead 100 may include the engine 126 having a plurality of flow directing plates, 146, 158, 146, a massage mode assembly 152, and additional mode varying components. The engine 126 is received within the spray head 104 and a cover 150 contains the engine 126 within the spray head 104 and provides an aesthetically pleasing appearance for the showerhead 100. FIG. 5 is a rear isometric view of the cover. With reference to FIGS. 1A, 2, and 5, the cover 150 is configured to generally correspond to the front end of the spray head 104 and may be a generally circularly shaped body. The cover 150 defines a plurality of apertures, such as the nozzle apertures 178 and the bank apertures 180*a*, 180*b*. As will be discussed below these apertures 178, 180*a*, 180*b* receive nozzles that form the nozzle groups 110, 112, 114, 116 of the showerhead 100. Accordingly, the shape, size, and position of the nozzle apertures 178 and bank apertures 180*a*, 180*b* may be provided to correspond to the number and position of the mode nozzles.

The cover 150 forms a cup-like structure on the rear side that defines a cover chamber 172. The cover chamber 172 may be configured to receive one or more components of the engine 126. A plurality of alignment brackets 174 define the perimeter of the cover chamber 172 and extend upward from an interior bottom wall 184. The alignment brackets 174 have a curvature substantially matching the curvature of the perimeter of the cover 150 and are spaced apart from one another around the perimeter. In one embodiment the showerhead cover 150 may include seven alignment brackets 174. However, the number of brackets 174 and the spacing between the brackets 174 may be varied based on the diameter of the cover 150, the number of modes for the showerhead 100, and other factors. Additionally, although a plurality of alignment brackets 174 are illustrated, in other embodiments the cover 150 may include a single outer wall defining the perimeter of the cover chamber 172. Each alignment bracket 174 may include a bracket aperture 176 defined therethrough.

With reference to FIG. 5, the alignment brackets 174 may be spaced apart from a top edge of a rim 186 forming the back end of the cover 150. The spacing between the brackets 174 and the top edge of the rim 186 defines a gap 188.

The interior bottom wall 184 of the cover 150 may include a center area 190 that is recessed further than the other portions of the bottom wall 184. The center area 190 may be located at a central region of the cover 150. A small disk-shaped recess 182 may be formed at the center point of the center area 190. The recess 182 is located below the interior surface of the center area 190 and extends outward past the exterior of the center area 190. The mode selector 118 may be a finger grip formed integrally with the cover 150 and extending outward from the rim 186.

Figure 6A:
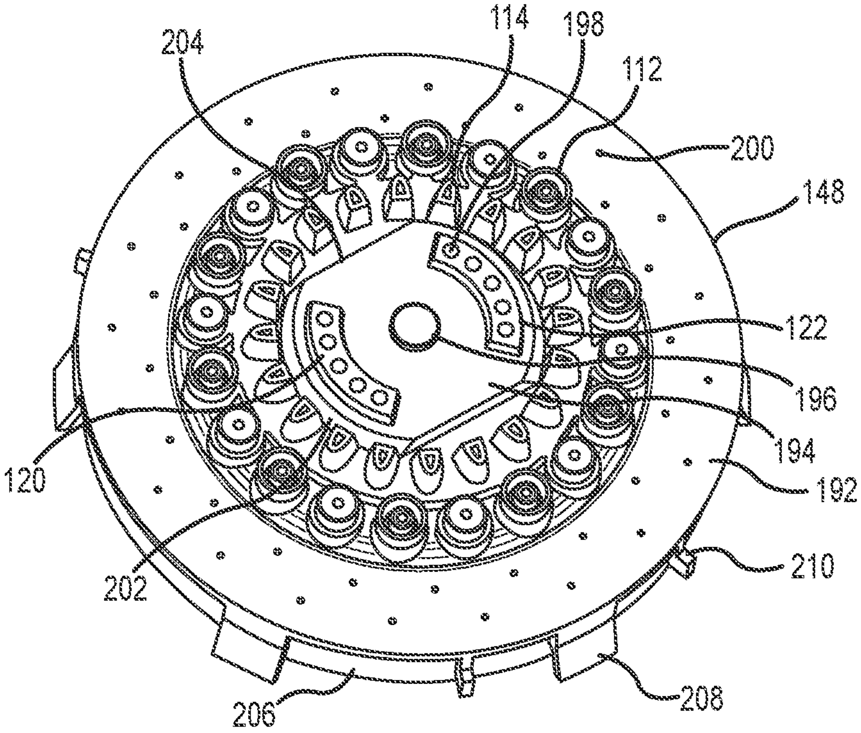
FIG. 6A is a front isometric view of a face plate for the showerhead.
Figure 6B:
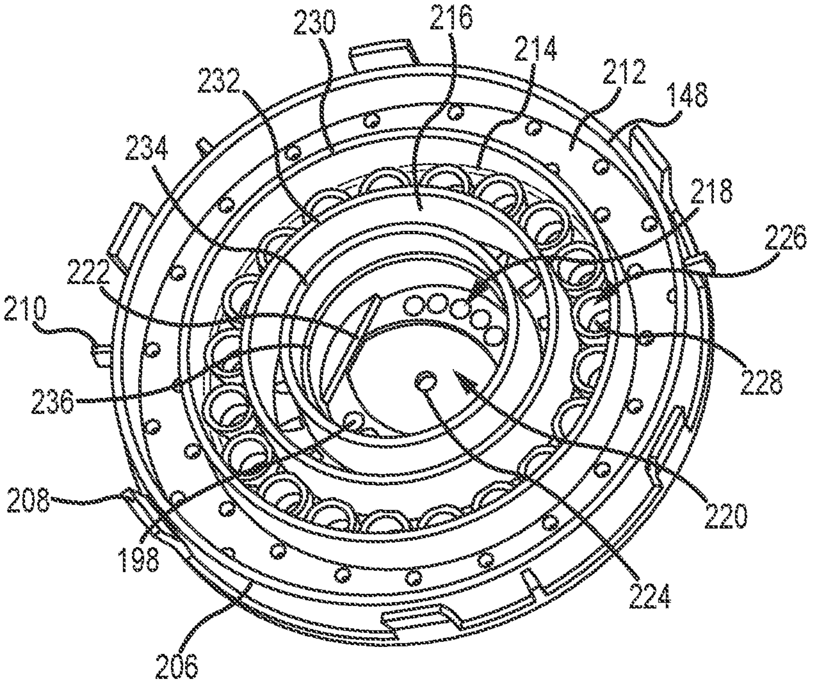
FIG. 6B is a rear isometric view of the face plate of FIG. 6A.
Figure 14:
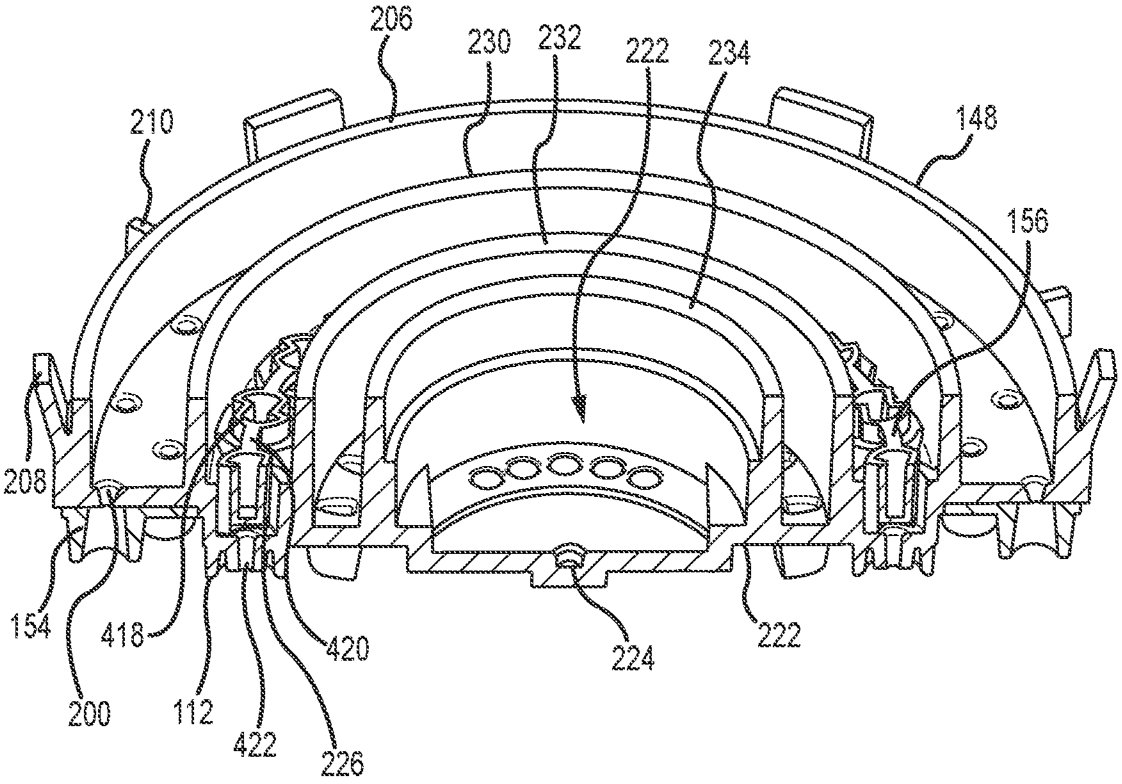
FIG. 14 is a cross-sectional view of the face plate and a mist ring of the showerhead of FIG. 1A.

The face plate 148 will now be discussed in more detail. FIGS. 6A and 6B are front and rear perspective views of the face plate 148. FIG. 14 is a cross-section view of the face plate 148 and mist plug ring 156. The face plate 148 includes a front surface 192 and a rear surface 194. The front surface 192 defines a plurality of outlets 198, 200 as well as the nozzles for select nozzle groups 112, 114. Depending on the desired spray characteristics for each mode of the showerhead 100, the outlets 198, 200 and nozzles 112, 114 may be raised protrusions with an outlet in the middle, apertures formed through the face plate 148, or the like. For example, the nozzles for the second nozzle group 112 may include raised portions that extend outward from the front surface 192 of the face plate 148 and on the back surface 194 may include nozzle chambers 226. The nozzle chambers 226 may be formed as individual cylindrical cavities that funnel toward the nozzle outlet. Each nozzle chamber 226 may include an interior shelf 228 defined toward a bottom end of the chamber 226. The interior shelf 228 reduces the diameter of the chamber 226 before the nozzle outlet, which may be formed as a mist outlet 422 defined through the shelf 228 on the bottom of the chambers 226.

With continued reference to FIGS. 6A, 6B and 14, the face plate 148 may include a raised platform 194 extending outward from a central region of the face plate 148. The platform 194 may include two curved sidewalls 202 facing one another and two straight sidewalls or edges 204 connecting the two curved sidewalls 202. The raised platform 194 also includes a nub 196 extending outward from the center of the platform 194. The two nozzle banks 120, 122 are defined as raised, curved formations on the top of the platform 194. In this example, the two nozzle banks 120, 122 are curved so as to form opposing parenthesis shapes facing one another with the nub 196 being positioned between the two banks 120, 122. The banks 120, 122 may generally match the curvature of the curved sidewalls 202 of the platform 194. Each bank 120, 122 may include a plurality of outlets 198. In one example, each bank 120, 122 may include five outlets 198; however, the number of outlets 198 and the positioning of the outlets may vary based on the desired output characteristics of the showerhead 100.

The nozzle groups 112, 114 may be formed in concentric rings surrounding the platform 194. In this manner, the banks 120, 122 may form the innermost ring of nozzles for the showerhead 100 with the remaining nozzle groups 110, 112, 114 surrounding the banks 120, 122.

With reference to FIG. 6B, the face plate 148 may also include a perimeter wall 206 extending outward from the perimeter edge of the bank surface 194. The perimeter wall 206 forms an outer wall of the face plate 148. The face plate 148 may include a plurality of concentric ring walls 230, 232, 234 that along with the perimeter wall 206 define a plurality of flow paths 212, 214, 216, 218. For example, the first ring wall 230 extends upward from the back surface 194 of the face plate 148 but is positioned closer toward the center of the face plate 148 than the outer perimeter wall 206. The gap between the perimeter wall 206 and the first ring wall 230 defines the first flow path 212 and includes a first set of outlets 200. As another example, the first ring wall 230 and the second ring wall 232 define the second flow path 214 that includes the second nozzle group 112 and the second ring wall 232 and the third ring wall 234 define the third flow path 216. When the face plate 148 is connected to the other plates of the showerhead 100, the flow paths 212, 214, 216, 218 defined by the various walls 206, 230, 232, 234 correspond to fluid channels for discrete modes of the showerhead 100. As should be understood, the walls 206, 230, 232, 234 prevent fluid from one flow path 212, 214, 216, 218 from reaching outlets and/or nozzles in another flow path when the engine 126 is assembled. The shape and locations of the walls may be varied based on the desired modes for the showerhead.

The third ring wall 234 defines the fourth flow path 218, as well as a massage chamber 220. The massage chamber 220 is configured to receive the massage mode assembly 152 as will be discussed in more detail below. The massage chamber 220 may include an annular wall 236 concentrically aligned and positioned against the third ring wall 234. However, the annular wall 236 is shorter than the third ring wall 234 so that it defines a shelf within the massage chamber 220.

A bottom surface of the massage chamber 220 includes two curb walls 222. The curb walls 222 extend toward a center of the chamber 220 and include a straight edge that varies the geometry of the bottom end of the chamber 220. The two curbs 222 oppose each other to transform the bottom end of the chamber 220 to a rectangle with curved ends or a truncated circle. The curb walls 222 generally correspond to the straight edges 204 of the platform 194 on the front surface 192 of the face plate 148.

A pin recess 224 is defined at the center of the chamber on the bottom surface and extends into the back of the nub 196. The pin recess 224 is configured to receive and secure a pin from the massage mode assembly 152 as will be discussed in more detail below. Additionally, the nozzle outlets 198 for each bank 120, 122 are defined along a portion of the bottom surface of the massage chamber 220.

Figure 7A:
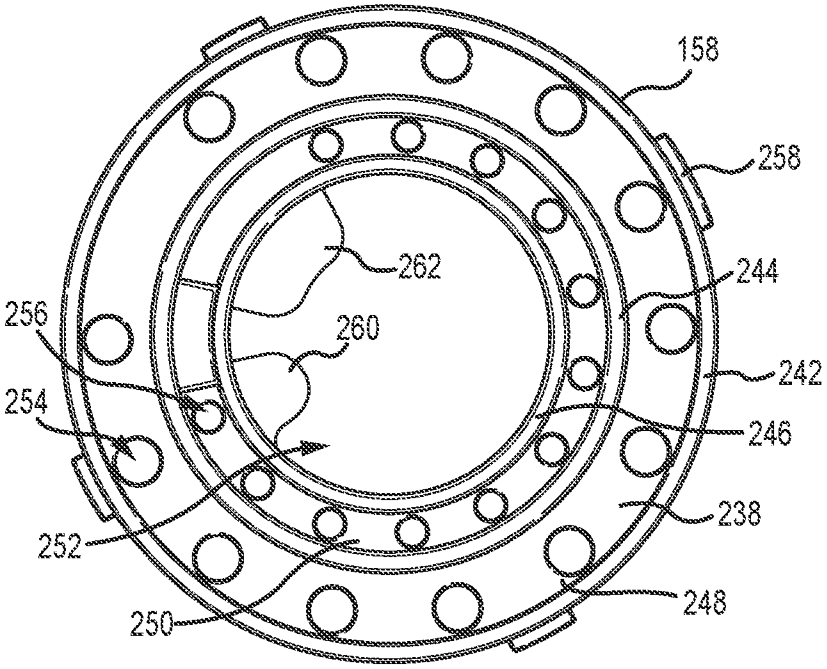
FIG. 7A is a front plan view of an inner plate of the showerhead.
Figure 7B:
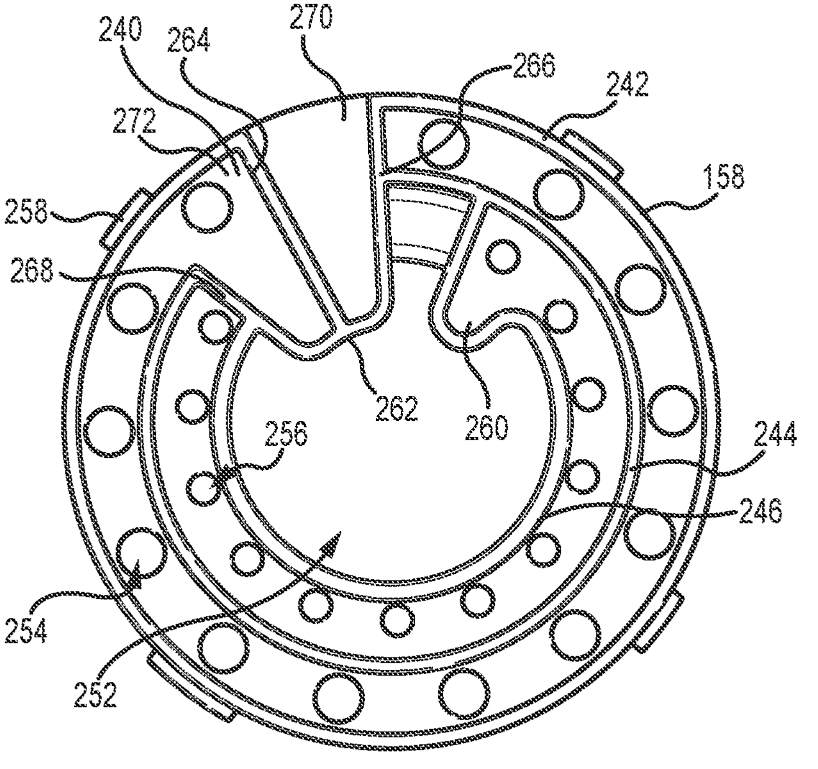
FIG. 7B is a rear plan view of the inner plate of FIG. 7A.

The engine 126 may also include an inner plate 158. The inner plate 158 may define additional modes for the showerhead. However, in embodiments where fewer modes may be desired, the inner plate may be omitted FIGS. 7A and 7B illustrate front and rear views, respectively, of the inner plate 158. With reference to FIGS. 7A and 7B, the inner plate 158 may be a generally circular plate having a smaller diameter than the face plate 148. The inner plate 158 may include a plurality of tabs 258 extending outward from a sidewall of the inner plate 158. A massage aperture 252 is formed through the center of the inner plate 158 such that the inner plate 158 has a ring or donut shape. Similar to the face plate 148, the inner plate 158 may include a plurality of walls defining a plurality of flow paths. For example, the inner plate 158 may include an outer perimeter wall 242 along the outer perimeter of the plate 158 and first and second ring walls 244, 246 defined concentrically within the perimeter wall 242. The perimeter wall 242 and the first and second ring walls 244, 246 extend from both the front and rear surfaces 238, 240 of the inner plate 158. The perimeter wall 242 and the first and second ring walls 244, 246 form closed concentric circles on the front surface 238. The perimeter wall 242 and the first ring wall 244 define a first flow path 248 and the first ring wall 244 and the second ring wall 246 define a second flow path 250. Each of the flow paths 248, 250 include apertures 254, 256 defined through the front surface and rear surfaces 238, 240 of the inner plate 158. As will be discussed in more detail below, the flow paths 248, 250 and the respective apertures 254, 256 fluidly connect select nozzle groups based on the selected mode of the showerhead 100.

With reference to FIG. 7B, the inner plate 158 may include a first finger 260 and a second finger 262 that project into the mode aperture 252 on the rear side of the inner plate 158. As will be discussed in more detail below, the fingers 260, 262 provide structural support for the mode selection components and help direct water to a desired fluid channel. The first finger 260 is fluidly connected to the second flow path 250. On the rear surface 240 of the inner plate 158, the second finger 262 includes a plurality of separating walls 264, 266, 268 that intersect with one or more of the outer wall 242, first ring wall 244, and/or second ring wall 246. For example, the first separating wall 264 bisects the second finger 262 to define a first portion 270 and a second portion 272. The first separating wall 264 intersects with the outer wall 242. The second separating wall 266 is defined on an outer edge of the second finger 262 and intersects with both the outer wall 242 and the first ring wall 244 to fluidly separate the first flow path 248 from the first portion 270 of the second finger 262. Similarly, the third separating wall 268 is formed on the opposite edge of the second finger 262 from the second separating wall 266. The third separating wall 268 intersects with the interior wall of the inner plate 158 defining the massage aperture 252 and the second ring wall 246. In this manner, the third separating wall 268 fluidly separates the second portion 272 of the second finger 262 from the second flow path 250.

Figure 8A:
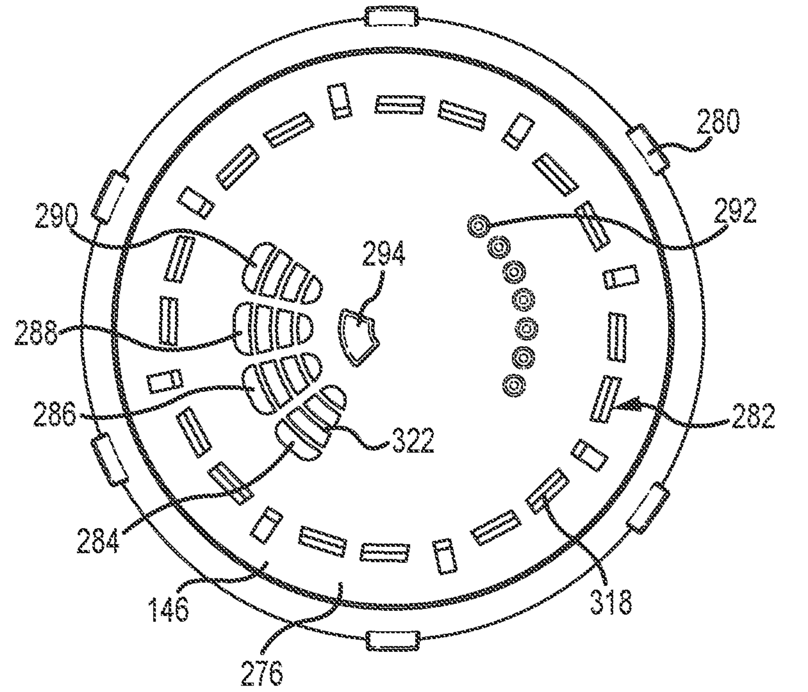
FIG. 8A is a top plan view of a back plate of the showerhead.
Figure 8B:
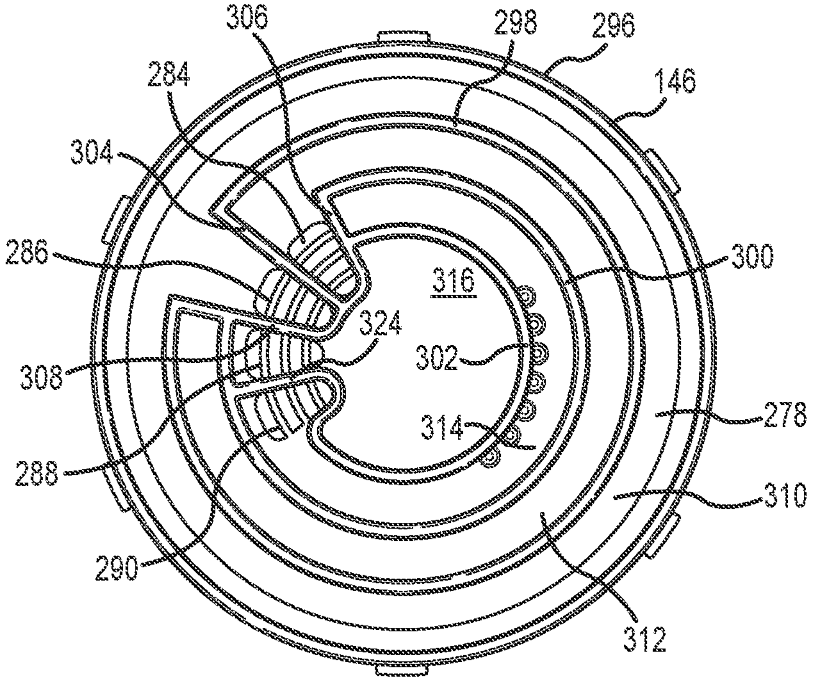
FIG. 8B is a bottom plan view of the back plate of FIG. 8A.

The back plate 146 for the showerhead 100 will now be discussed in more detail. FIGS. 8A and 8B are top and bottom views of the back plate 146. With reference to FIGS. 8A and 8B, the back plate 146 has a back side 276 and a front side 278. A perimeter wall 296 extends outward and at an angle from the back side 276 and then transitions to a cylindrical form to extend normal to the front side 278. In embodiments where the perimeter wall 296 is angled, the back side 276 of the back plate 146 may have a frustum or partially conical shape (see FIGS. 2 and 8A). The back plate 146 may include a plurality of tabs 280 extending outward and spaced apart from one another on the outer surface of the perimeter wall 296. The configuration of the back plate may be modified based on the connection to the spray head as will be discussed in more detail below.

With reference to FIG. 8A, a locking band 282 is formed on the back side 276 of the back plate 146. The locking band 282 includes a plurality of locking fingers 318. The locking fingers 318 are spatially separated from each other and are configured to act as fasteners to connect the back plate to the mounting plate 144, as will be discussed in more detail below. The locking fingers 318 are separated from one another so that they will be more flexible than a solid band of material so as to allow the fingers 318 to flex and resiliently return to an initial position. The locking fingers 318 may include lips 320 (see FIG. 4) extending from a front sidewall. The locking band 282 is defined in a generally circular shape on the back side 276.

With continued reference to FIG. 8A, the back plate 146 may also include a plurality of detent recess 292 defined on the back side 276. In one embodiment, there may be seven detent recess 292, however, the number of recesses 292 may be based on a desired number of modes for the showerhead 100. Thus, as the number of modes varies, so may the number of detent recesses 292. The back plate 146 may also include a stop bump 294 extending upward from the back side 276. The stop bump 294 may be somewhat trapezoidal-shaped with a curved interior surface facing the center of the back plate 146.

With continued reference to FIG. 8A, the back plate 146 includes a plurality of mode apertures 284, 286, 288, 290. The mode apertures 284, 286, 288, 290 are somewhat triangularly shaped apertures and are positioned adjacent one another. Each of the apertures 284, 286, 288, 290 may correspond to one or more modes of the showerhead 100, as will be discussed below. In some embodiments, the mode apertures 284, 286, 288, 290 may include a plurality of support ribs 322 extending lengthwise across each aperture to form groups of apertures.

With reference to FIG. 8B, the back plate 146 may include a plurality of ring walls 298 300, 302 extending outward from the front side 278. Similar to the other plates of the showerhead, the ring walls 298, 300, 302 of the back plate 146 may be generally concentrically aligned and may have decreasing diameters, where combinations of ring walls define flow paths for the back plate 146. In particular, the outer perimeter wall 296 and the first ring wall 298 define a first flow path 310, the first ring wall 298 and the second ring wall 300 define a second flow path 312, the second ring wall 300 and the third ring wall 302 define a third flow path 314, and the third ring wall 302 defines a forth flow path 316.

Similar to the inner plate 158, the back plate 146 may include a plurality of separating walls 304, 306, 308 that fluidly separate the flow paths 310, 312, 314 from one another. In one embodiment, the back plate 146 may include a first separating wall 304 that intersects with the first ring wall 298 to fluidly separate the first flow path 310 from the second flow path 312, a second separating wall 306 intersects the second and third ring walls 300, 302 to separate the second flow path 312 from the third flow path 314, and a third separating wall 308 that intersects the second and third ring walls 300, 302 to separate the froth flow path 316 from the other flow paths. In this embodiment, the third ring wall 302 may transition into a separating wall 324 that functions to separate the fourth flow path 316 from the first flow path 310. The separating walls 304, 306, 308, 324 are configured to separate each of the mode apertures 284, 286, 288, 290 accordingly the thickness of the separating walls 304, 306, 308, 324 may be determined in part by the separation distance between each of the mode apertures 284, 286, 288, 290.

Figure 9A:
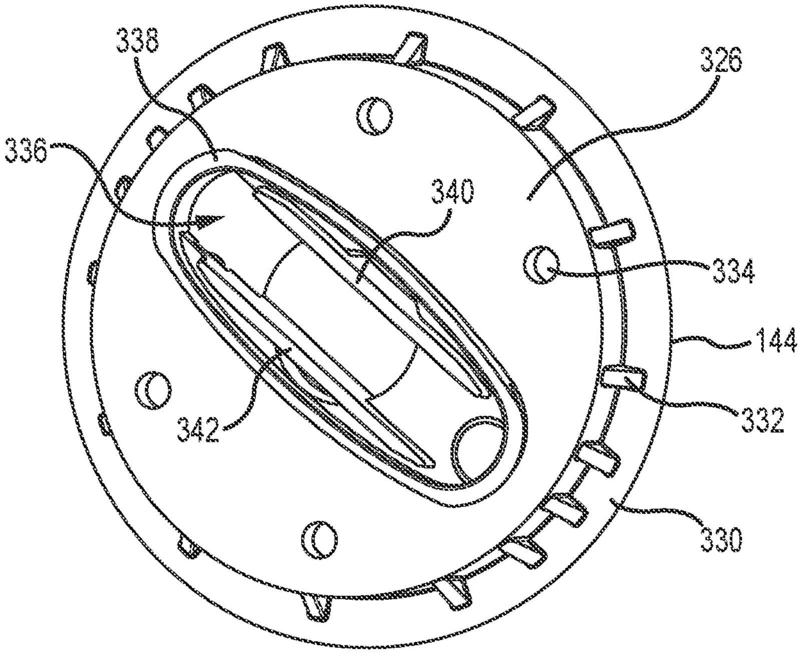
FIG. 9A is a top isometric view of a mounting plate for the showerhead.
Figure 9B:
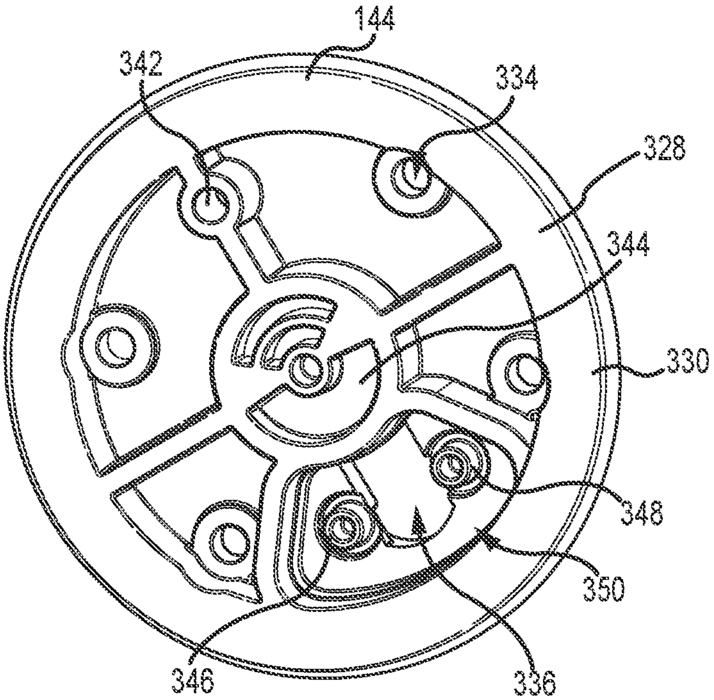
FIG. 9B is a bottom isometric view of the mounting plate of FIG. 9B.

A mounting plate 144 connects the engine 126 to the showerhead 100. FIGS. 9A and 9B illustrate top and bottom views of the mounting plate 144. With reference to FIGS. 9A and 9B, the mounting plate 144 may include a top face 326 and a bottom face 328. A brim 330 extends outward from a terminal bottom edge of the 1 top face 326. The brim 330 has a larger diameter than the top face 326 and may be substantially planar. A plurality of braces 332 extend upward 3 at an angle between at sidewall of the top face 326 and the brim 330 to provide support for the top face 326 of the mounting plate 144.

With reference to FIG. 9A, the mounting plate 144 may include an oval shaped engagement wall 338 extending upward from the top face 326. The engagement wall 338 extends across a width of the top face 326. Two parallel sidewalls 340, 342 are positioned within the engagement wall 338 along the longitudinal sides of the engagement wall 338. The sidewalls 340, 342 are parallel to each other and a spaced apart from the interior surface of the engagement wall 338. An engine inlet 336 is defined as an aperture through the top face 326 of the mounting plate 144. The engine inlet 336 is defined at one end of the engagement wall 338 and is surrounded by the engagement wall 338. The mounting plate 144 may further include a plurality of fastening apertures 334 defined at various positions on the top face 326.

With reference to FIG. 9B, the mounting plate 144 may include a seal cavity 350 defined by walls extending upward from the bottom face 328. The seal cavity 350 may have a somewhat trapezoidal shape but with one of the walls being slightly curved. The engine inlet 336 is located within the seal cavity 350. The mounting plate 144 may also include two spring columns 346, 348 extending downward from the bottom face 328. The spring columns 346, 348 are positioned on opposite sides of the engine inlet 336 and may be formed on a bottom surface of the two parallel sidewalls 340, 342 on the top end of the mounting plate 144.

With continued reference to FIG. 9B, the mounting plate 144 may further include a stop cavity 344 defined as a semicircular cavity in the central region of the bottom face 328. The stop cavity 344 may be configured to correspond to the shape and of the stop bump 294 of the back plate 146 to allow the stop bump 294 to be received therein. A detent pin cavity 342 is defined on an opposite side of the bottom face 328 from the seal cavity 350. The detent pin cavity 342 may be a generally cylindrically-shaped volume.

Figure 10:
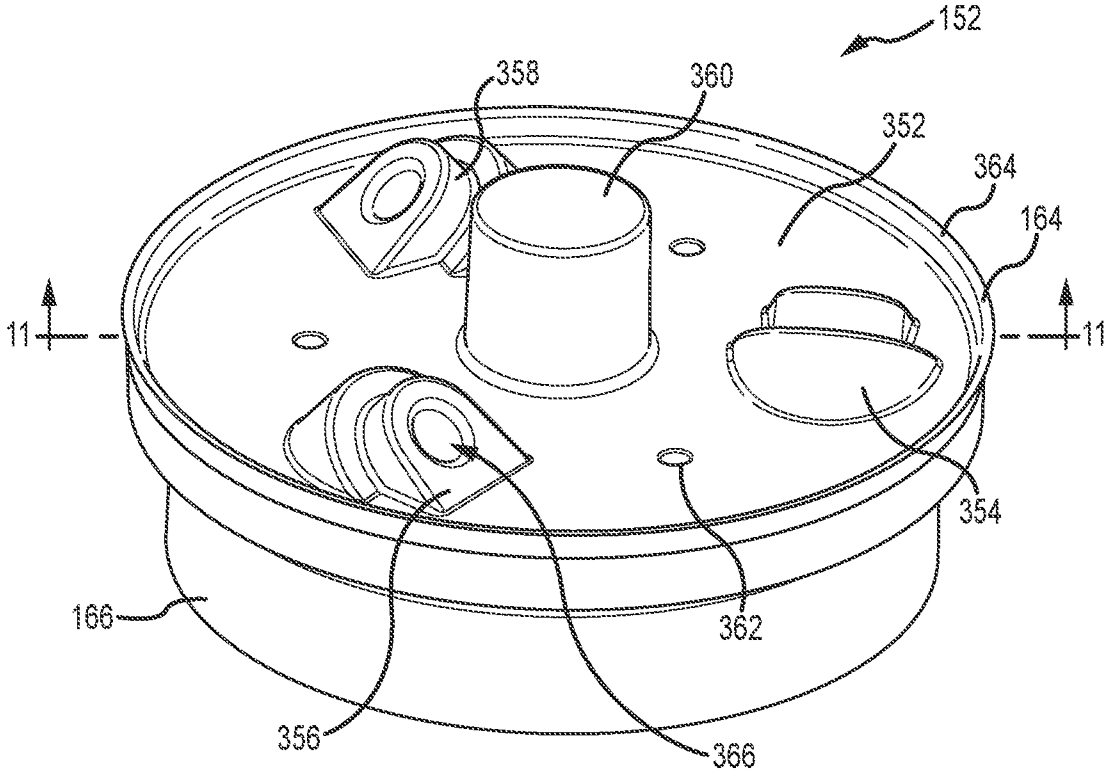
FIG. 10 is a top isometric view of the massage mode assembly of the showerhead.
Figure 11:
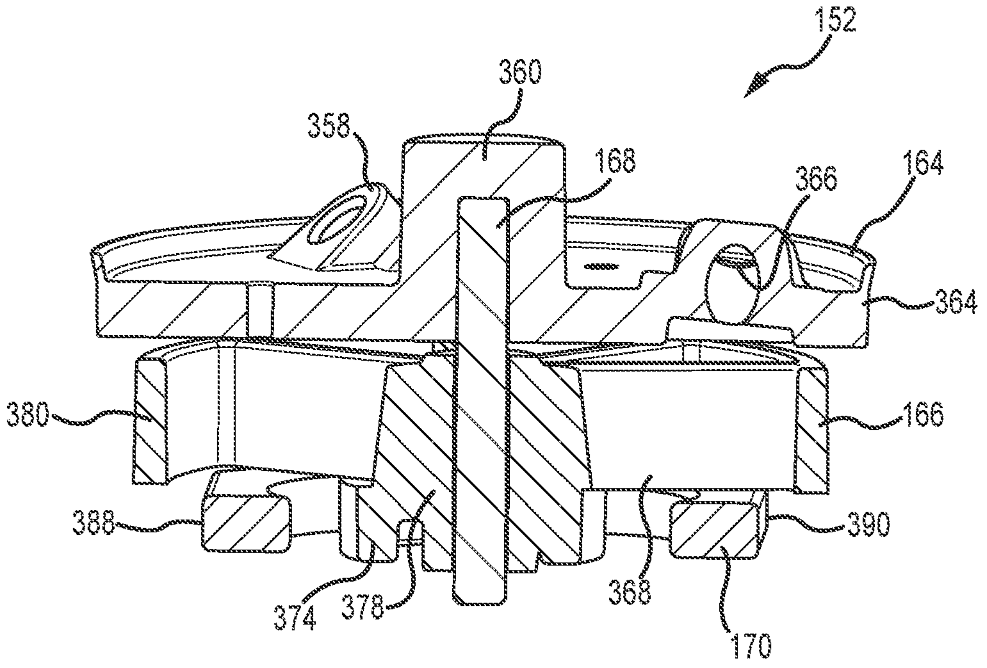
FIG. 11 is a cross-sectional view of the massage mode assembly taken alone line 11-11 in FIG. 10.
Figure 12:
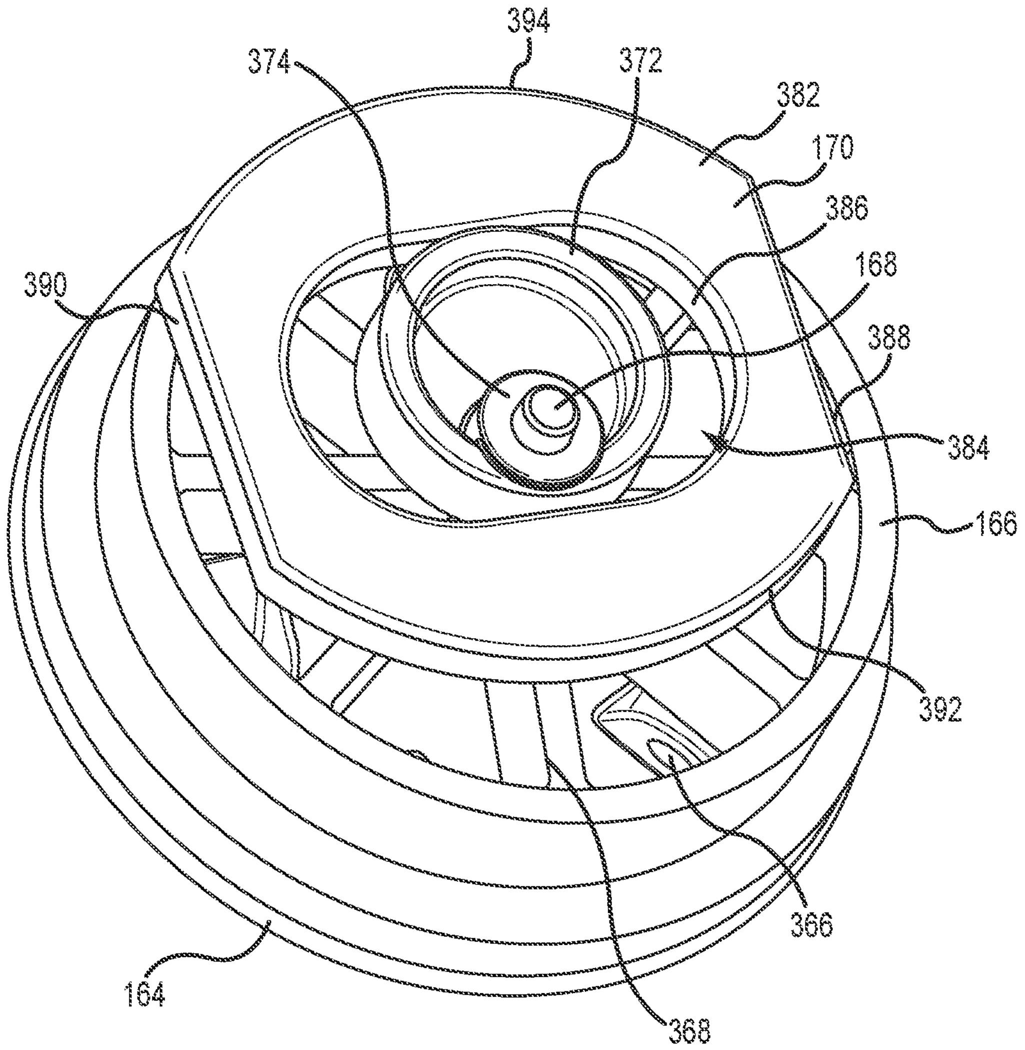
FIG. 12 is a bottom isometric view of the massage mode assembly of FIG. 10.

The massage mode assembly 152 will now be discussed in more detail. FIG. 10 is a top perspective view of the massage mode assembly 152. FIG. 11 is a cross-sectional view of the massage mode assembly 152 taken along line 11-11 in FIG. 10. FIG. 12 is a bottom isometric view of the massage mode assembly 152 of FIG. 10. With reference to FIGS. 2, 10, and 11, the massage mode assembly 152 may include a jet plate 164, a pin 168, a turbine 166, and a shutter 170. Each of these components will be discussed in turn below.

The jet plate 164 forms a top end of the massage mode assembly 152 and may be a generally planar disc having a plurality of inlet jets 354, 356, 358. The inlet jets 354, 356, 358 are raised protrusions that extend upward and at an angle from the top surface 352 of the jet plate 164. Each inlet jet 354, 356, 358 includes an inlet aperture 366 providing fluid communication through the jet plate 164. A plurality of pressure apertures 362 may be defined through the jet plate 164 and spaced apart from the inlet jets 354, 356, 358.

With reference to FIGS. 10 and 11, the jet plate 164 may also include an anchor column 360 extending upward from the top surface 352. The anchor column 360 may be at least partially hollow to define a cavity configured to receive the pin 168 (see FIG. 11). Additionally, the jet plate 164 may include a rim 364 extending upward from the top surface 352 along the outer perimeter edge of the top surface 352.

Figure 13A:
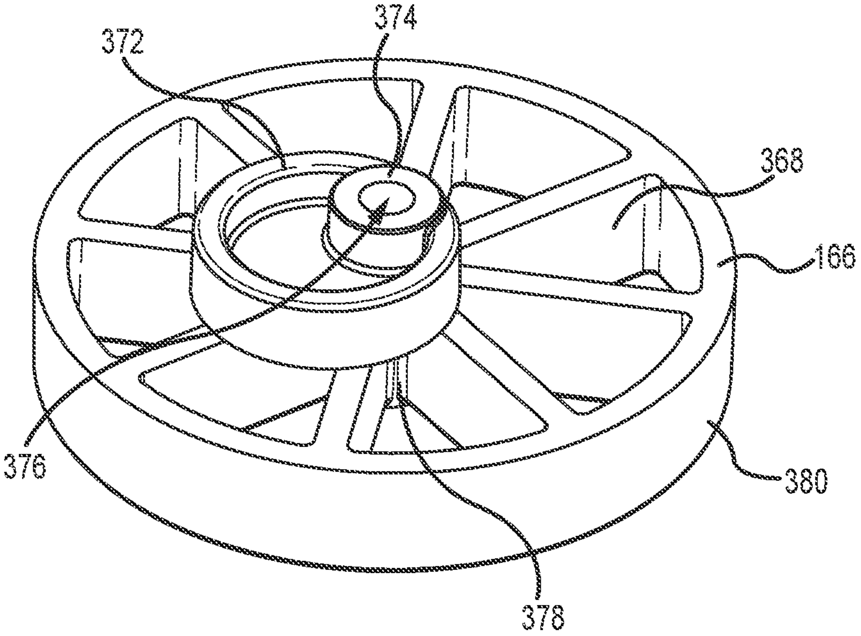
FIG. 13A is a bottom isometric view of a turbine for the massage mode assembly.
Figure 13B:
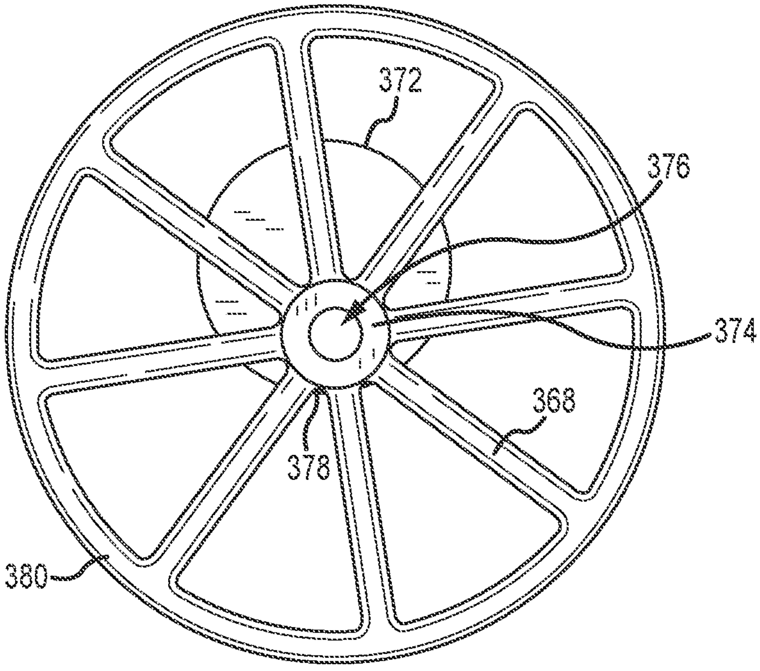
FIG. 13B is a top plan view of the turbine of FIG. 13A.

The turbine 166 of the massage mode assembly 152 will now be discussed. FIGS. 13A and 13B are various views of the turbine. The turbine 166 may be a generally hollow open-ended cylinder having blades 368 extending radially inward toward a central hub 378 from a generally circular turbine wall 380. The turbine wall 380, or portions thereof, may be omitted in some embodiments. Additionally, although eight blades 368 have been illustrated, the turbine 166 may include fewer or more blades 368. The turbine 166 may include a pin-shaped extrusion 374 extending generally through the hub 378. The pin shaped extrusion 374 may extend slightly upward from the upper side of the turbine 166 and downward from the lower side of the turbine 166. A pin aperture 376 is defined longitudinally through the pin-shaped extrusion 374 and has a diameter corresponding to a diameter of the pin 168.

The turbine 166 may also include an eccentric cam 372 on its lower side (i.e., the downstream side of the turbine 166). The cam 372 is positioned off-center from the hub 378 and is formed integrally with the turbine 166. In one embodiment, the cam 372 includes a cylindrically shaped disc that is offset from the center of the turbine 166. In other embodiments, the cam 372 may be otherwise configured and may be a separate component connected to or otherwise secured to the turbine 166. (See, e.g., FIG. 31 illustrating alternative examples of the cam and turbine structure).

With reference to FIG. 12, the shutter 170 will now be discussed in more detail. The shutter 170 or shoe includes a shutter body 382 having a cam aperture 384 defined therethrough. The shutter body 382 is a solid section of material (other than the cam aperture 384), which allows the shutter 170 to selectively block fluid flow to outlets when positioned above those outlets. The cam aperture 384 may be a generally oval-shaped aperture defined by an interior sidewall 386 of the shutter body 382. The width of the cam aperture 384 is selected to substantially match the diameter of the cam 372 of the turbine 166. However, the length of the cam aperture 384 is longer than the diameter of the cam 372.

Figure 18:
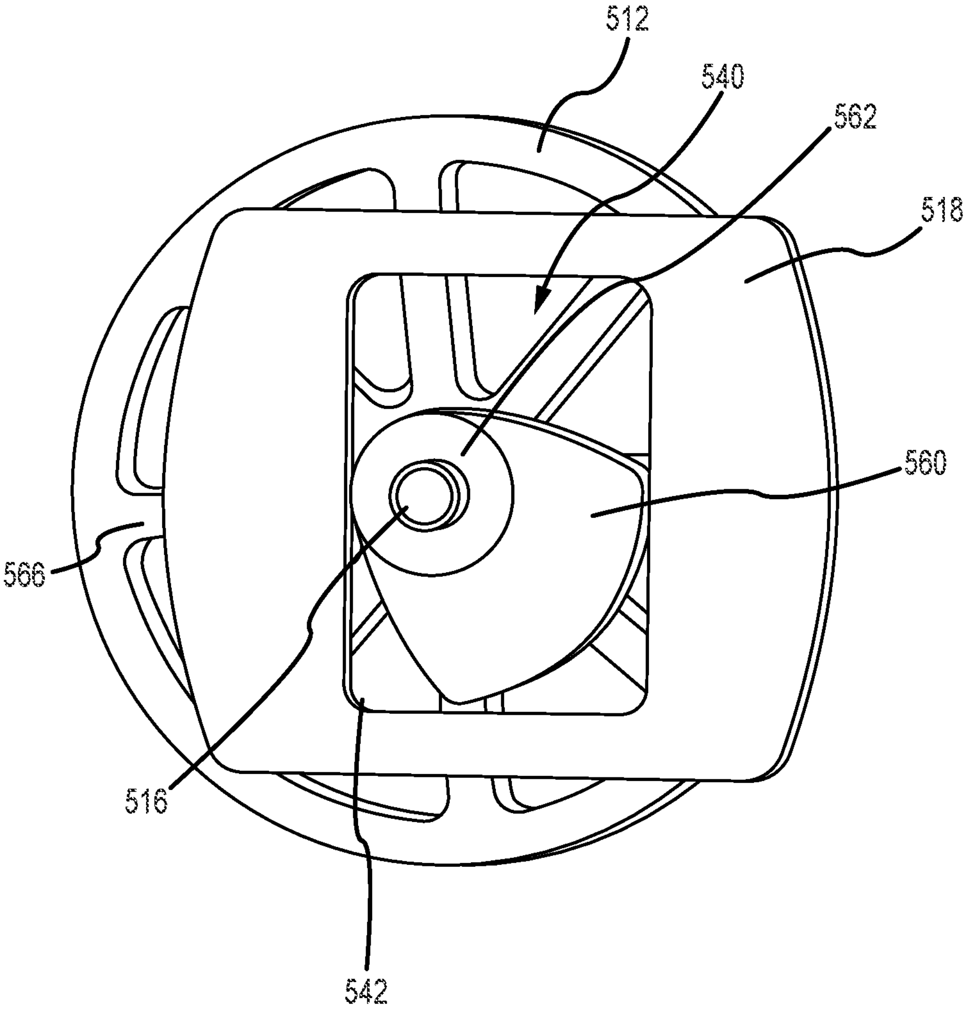
FIG. 18 is a bottom plan view of a turbine, shutter, and a cam of a massage mode assembly.

With continued reference to FIG. 12, the shutter 170 may be a substantially planar disc having a generally oval shaped body 382 but with two parallel constraining edges 388, 390 formed on opposing ends. In particular, the shutter body 382 may have two relatively straight constraining edges 388, 390 formed at opposite ends from one another and two curved edges 392 formed on opposite sides from one another. In one embodiment, the curved ends 392 form the longitudinal edges for the shutter body 382 and the constraining edges 388, 390 form the lateral edges. However, in other embodiments, the shutter 170 may be otherwise configured (see e.g., FIG. 18).

As briefly mentioned above with respect to FIG. 2, the showerhead 100 may also include a mist plug ring 156. The mist plug ring 156 creates a mist output from the showerhead 100 nozzles, in particular the second nozzle group 112. With reference to FIGS. 2 and 14, the mist plug ring 156 may include a plurality of mist plugs 418 interconnected together on a ring 420. There may be a mist plug 418 for every mist outlet 422 in the second nozzle group 112. The mist plugs 418 may have a "Z" shape configured to seat against some portions of the sidewall of the mist nozzle chamber 226, but not fill the entire chamber 226. In particular, the stepped or notched edges on either side of the mist plugs 418 provide a gap between the sidewall of the chamber 226 and the plug 418 to allow water to flow into the chamber 226 and through the outlet 422. As will be discussed in more detail below, the mist plugs 418 create a varying fluid flow within the mist chamber 226 that creates a misting characteristic for the water outflow.

In some embodiments, the variation in geometry within the mist chambers 226 caused by the shape of the mist plugs 418 may be achieved by varying the geometry the mist chambers 226 themselves. That is, the mist chambers 226 can be modified so that the chambers 226 includes a geometry that changes one or more characteristics of the fluid flow through the chamber, such as inducing a spin, to create a desired output characteristic for the water. However, it should be noted that in embodiments where the variation in the geometry of the mist chambers 226 is created due to the inserted mist plug ring 156, the showerhead 100 may be manufactured at less cost than in instances where the geometry change is done by varying the chamber itself.

Figure 15:
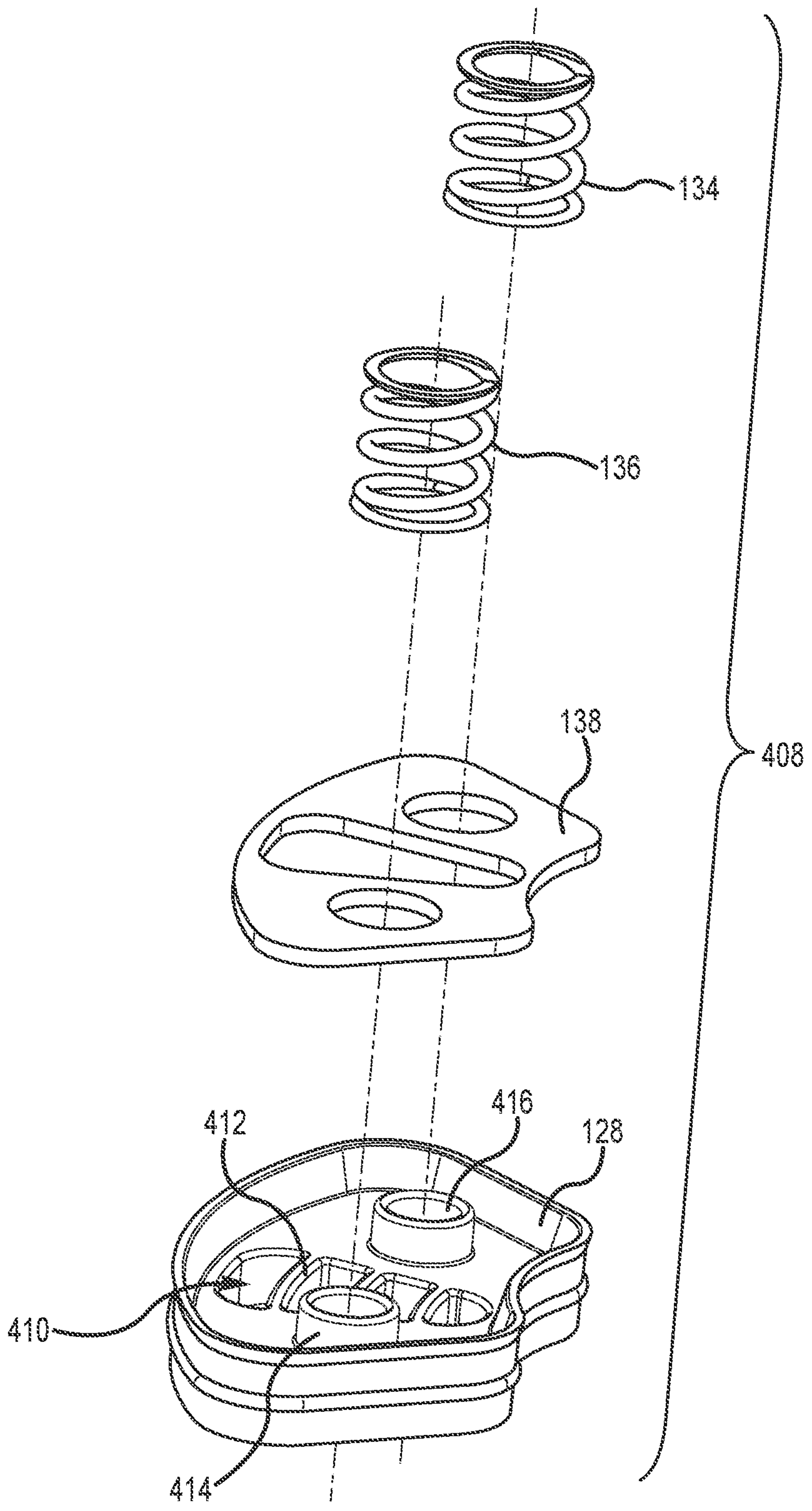
FIG. 15 is an exploded view of a selecting assembly for the showerhead of FIG. 1A.

The mode selection assembly 408 will now be discussed in more detail. FIG. 15 is an enlarged view of a portion of the exploded view of FIG. 2 illustrating the mode selection assembly 408. With reference to FIG. 15, the mode selection assembly 408 may include biasing members 134, 136, a seal support 138, and a mode seal 128. The mode seal 128 is shaped to correspond to the seal cavity 350 in the mounting plate 144 and is configured to seal against the top surface of the back plate 146, which allows a user to selectively direct fluid flow form the handle to a particular set or group of nozzles of the showerhead 100. For example, the mode seal 128 may be a sealing material, such as rubber or another elastomer, and may include a mode select aperture 410 define therethrough. In this manner, the mode seal 128 can be aligned with a particular mode aperture to fluidly connect the handle 102 to the engine 126 and to a particular mode aperture within the engine 126, while sealing the other mode apertures into the engine 126. In some embodiments, the mode select aperture 410 may be configured to substantially match the configuration of the mode apertures 284, 286, 288, 290 and so may include a plurality of support ribs 412 spanning across the width of the aperture 410. However, in other embodiments the ribs 412 may be omitted. The mode seal 128 may also include first and second spring columns 414, 416 extending upward from a top surface thereof.

The seal support 138 provides additional rigidity and structure to the mode selection assembly 408, in particular, to the mode seal 128. The seal support 138 may be, for example, a rigid material such as plastic, metal, or the like. The structure provided by the seal support 138 assists the seal 128 in maintaining a sealed relationship with the back plate 146 when under water pressure. In some embodiments, the seal support 138 may substantially match the configurations of the mode seal 128 and may include apertures for the spring columns 414, 416 and mode select aperture 410. Although the seal support 138 is shown as a separate component from the mode seal 128, in other embodiments, the seal support 138 may be integrated to the structure of the mode seal 128.

Assembly of the Showerhead

With reference to FIGS. 2 and 4, assembly of the showerhead 100 will now be discussed in more detail. At a high level the engine 126 is assembled and then connected to the spray head 104 as will be discussed in more detail below. To assemble the engine 126, the massage mode assembly 152 is assembled and then the flow directing plates, i.e., the front plate 148, the inner plate 146, and the back plate 146, are connected together with the nozzle ring 154 and mist ring 156 connected to the respective plates. In particular, with reference to FIG. 11, the pin 168 of the massage mode assembly 152 is received into the corresponding aperture in the anchor column 360 of the jet plate 164. The pin-shaped extrusion 374 of the turbine 166 is then slid around the pin 168. The turbine 166 is oriented so that the cam 372 is located on the opposite side of the turbine 166 that faces the jet plate 164. With the turbine 166 and jet plate 164 connected via the pin 168, the shutter 170 is connected to the turbine 166. Specifically, the cam 372 of the turbine is positioned within the cam aperture 384 of the shutter 170.

Once the massage mode assembly 152 has been constructed, the massage mode assembly 152 is connected to the face plate 148 and is received within the massage chamber 220. With reference to FIGS. 2, 4, 6B, and 11, the pin 168 is positioned within the pin recess 224 on the shelf 228 of the face plate 148. The shutter 170 is oriented such that the constraining edges 388, 390 are parallel to the curb walls 222 of the face plate 148. The curved walls 392, 394 of the shutter 170 align with the curved walls of the massage chamber 220. As shown in FIG. 4, the turbine 166 is received within the massage chamber 220 so as to be positioned below a top edge of the annular wall 236 of the massage chamber 220 and the bottom edge of the jet plate 164 seats on top of the annular wall 236. The annular wall 236 supports the jet plate 164 and prevents the jet plate 164 from frictionally engaging the top of the turbine 166 to help ensure that the turbine 166 has clearance from the jet plate 164 to allow the turbine 166 to rotate without experiencing frictional losses from engagement of the jet plate 164. The spacing gap between the turbine 66 and the jet plate 164, as determined by the height of the annular wall 236, may be varied as desired.

In the embodiment shown in FIG. 4, the turbine inlets 354, 356, 358 are on a top surface of the jet plate 164 so that the inlets 354, 356, 358 do not interfere with the motion of the turbine 166. However, in other embodiments, the inlets 354, 356, 358 may be positioned on a bottom surface of the jet plate 164 and the turbine 166 may be spaced a greater distance away from the jet plate 164 than as shown in FIG. 4 so as to allow further clearance between the top of the turbine 166 and the turbine jet inlets 354, 356, 358. It should be noted that the jet plate 164 may be press fit against the sidewalls of the third ring wall 234 so that the jet plate 164 is secured in position and the jet plate 164 helps to secure the pin 168 in position within the pin recess 224. This configuration secures the massage mode assembly 152 to the facet plate 148, while still allowing the turbine 166 to rotate within the massage chamber 220.

With reference to FIGS. 4, 6B, and 14, once the massage mode assembly 152 is positioned within the massage chamber 220, the mist plug ring 156 is connected to the face plate 148. In one embodiment, the mist plugs 398 are received in the respective nozzle chambers 226, with the bottom end of each mist plug 398 raised above the shelf 228 surround the nozzle outlet 396. As discussed above with respect to FIG. 14, the mist plugs 398 are configured so that water can flow around the mist plugs 398 and into the chamber 226 and out through the mist outlets 396 as will be discussed in more detail below.

In some embodiments the mist plugs 398 may be interconnected together by the ring 420 of webbing. In these embodiments, the mist plugs 398 may be easier to handle and assemble than if they were individual plugs that were not interconnected. For example, a user assembling the showerhead 100 can pick up the ring 420, which may be easier to handle than the individual plugs 398, and then press fit each plug 398 into its respective chamber 226. The webbing forming the interconnections between the mist plugs 398 in the ring 420 may also rest on the upper rims of each of the chambers 226. The length of the mist plugs 398 below the webbing of the ring 420 may not be as long as the depth of the chambers 226. The bottoms of the mist plugs 398 are thereby spaced apart from the shelf 228 in each of the chambers 226.

After the mist plug ring 156 is connected to the face plate 148, the inner plate 158 may be connected to the face plate 148. With reference to FIGS. 4, 6B-7B, the inner plate 158 is coaxially aligned with the face plate 148 and the massage aperture 252 is positioned over the massage chamber 220 so as to allow fluid communication to the massage chamber 220 although the inner plate 158 is positioned above the face plate 148.

The front surface 238 of the inner plate 158 is aligned so as to face the back surface 194 of the face plate 148. The outer wall 242 of the inner plate 158 sits on top of the first ring wall 230 of the face plate 148 and the first ring wall 244 of the inner plate 158 sits on top of engages the second ring wall 232 of the face plate 148. The engagement between the outer wall 242 and first ring wall 244 of the inner plate 158 with the first ring wall 230 and second ring wall 232, respectively, of the face plate 148 defines a second fluid channel 398 (see FIG. 4). That is, the engagement of the walls of the face plate 148 and inner plate 158 fluidly connects the first flow path 248 of the inner plate 158 and the second flow path 214 of the face plate 148 to define the fluid channel 398 within the showerhead 100.

Similarly, the first ring wall 244 and the second ring wall 246 of the inner plate 158 engage with the second ring wall 232 and third ring wall 234 of the face plate 148 to define a third fluid channel 400, which is formed by the second flow path 250 of the inner plate and the third flow path 216 of the face plate 148.

The two fingers 260, 262 of the inner plate 158 jut out over the massage chamber 220 and the massage mode assembly 152. However, due to the separating walls 264, 266, 268, fluid can be selectively distributed to one or more fluid channels either individually or in combination with one another, as discussed in more detail below.

With reference to FIGS. 4, 6A-8B, once the inner plate 158 has been aligned with and connected to the face plate 148, the back plate 146 is connected to the inner plate 158 and face plate 148. In particular, the perimeter wall 296 of the back plate 146 is aligned with perimeter wall 206 of the face plate 148 so as to engage one another. In this manner, the back plate 146 may be configured so that the back side 276 will be positioned above stream from the front side 278 of the back plate 146.

The first ring wall 298 of the back plate 146 engages the top surface of the outer wall 242 of the inner plate 158. Thus, the combination of the back plate 146, the inner plate 158, and the front plate 148 defines a first fluid channel 396 (see FIG. 4). Additionally, the second ring wall 300 of the back plate 146 engages the first ring wall 244 of the inner plate 158 to define an upper second mode channel 404 (see FIG. 4). As will be discussed in more detail below, the first apertures 254 of the first flow path 248 of the inner plate 158 fluidly connect the upper second mode channel 404 to the second mode channel 398 defined by the face plate 148 and the inner plate 158.

With continued reference to FIGS. 4, 6A-8B, the third ring wall 302 of the back plate 146 engages the second ring wall 246 of the inner plate 158 so that the engagement of the first and second ring walls 244, 246 of the inner plate 158 with the second and third ring walls 300, 302, respectively, of the back plate 146 define an upper third mode channel 406. The upper third mode channel 406 is fluidly connected to the third mode channel 400 via the second set of apertures 256 of the inner plate 158, as will be discussed in more detail below.

The second ring wall 246 of the inner plate 158 and the third ring wall 302 of the back plate 146 define the fourth mode channel 402 (see FIG. 4). The fourth mode channel 402 is fluidly connected to the massage mode assembly 152.

The separating walls 264, 266, 268 of the inner plate 158 engage with the respective separating walls 304, 306, 308 of the back plate 146 to define the various distribution channels for each mode of the showerhead. For example, separating wall 268 of the inner plate 158 engages with separating wall 306 of the back plate 146, separating wall 264 of the inner plate 158 engages with separating wall 304 of the back plate 146, and separating wall 266 of the inner plate 158 engages with separating wall 308 of the back plate 146.

Due to the engagement between the inner plate 158 and the back plate 146, the first mode aperture 284 is fluidly connected to the fourth mode channel 404, the second mode aperture 286 is fluidly connected to the first mode channel 396, the third mode aperture 288 is fluidly connected to the fourth mode channel 402, and the fourth mode aperture 290 is fluidly connected to the upper third mode channel 406. In this example, the first mode aperture 284 corresponds to a mist mode, the second mode aperture 286 corresponds to a full body mode, the third mode aperture 288 corresponds to a massage mode, and the fourth mode aperture corresponds to a focused spray mode. However, the above mode examples are meant as illustrative only and the types of modes, as well as the correspondence between particular mode apertures may be varied as desired.

The face plate 148, inner plate 158, and the back plate 146 may be connected together once assembled. For example, the plates 146, 148, 158 may be fused such as through ultrasonic welding, heating, adhesive, or other techniques that secure the plates together. Once secured, the face plate 148, inner plate 158, and back plate 146, along with the massage mode assembly 408, form the engine 126 of the showerhead 100. This allows the engine 126 to be connected to the spray head 104 as a single component, rather than individually attaching each of the plates. Additionally, the connection between each of the plates may be substantially leak proof such that water flowing through each of the channels within plates is prevented from leaking into other channels.

Once the back plate 146 is connected to the inner plate 158, the mounting plate 144 and the mode selection assembly 408 may be connected to the back plate 146. With reference to FIGS. 2, 4, 8A, 9A-9B, and 15, the first and second biasing members 134, 136 are received around the first and second spring columns 346, 348, respectively, of the mounting plate 144. The biasing members 134, 136 are then received through the corresponding biasing apertures in the seal support 138. The mode seal 128 is then connected to the biasing members 134, 136 as the biasing members 134, 136 are received around the spring columns 414, 416 of the mode seal 128. The mode seal 128 is then positioned within the seal cavity 350 of the mounting plate 144.

In embodiments where the showerhead 100 includes a feedback feature, the spring 140 is received around a portion of the plunger 142 and the plunger and spring are received into the detent pin cavity 342 of the mounting plate 144. The spring 140 is configured to bias the plunger 142 against the back side 276 of the back plate 146.

After the mode selection assembly 408 and the plunger 142 and spring 140 are connected to the mounting plate 144, the mounting plate 144 is connected to the spray head 104. An O-ring 150 is received around the outer surface of the engagement wall 338 of the mounting plate 144. The fasteners 132*a*, 132*b*, 132*c*, 132*d* are then received through the fastening apertures 334 in the mounting plate 144 and secure into corresponding fastening posts (not shown) extending from a surface within the spray head 104 and/or handle 102. The fasteners 132*a*, 132*b*, 132*c*, 132*d* secure the mounting plate 144 to the showerhead 100.

Once the mounting plate 144 is connected to the spray head 104, the engine 126 may be connected to the mounting plate 144. In particular, the brim 330 of the mounting plate 144 is received within the locking band 282 and the fingers 318 flex to allow the brim 330 to be positioned within the locking band 282 and then snap-fit around the edge of the brim 330. The lips 320 on each of the fingers 318 extend over a portion of the brim 330 (see FIG. 4) to grip the brim 330. Because the engine 126 is secured together as a single component, the engine 126 can be quickly attached and detached from the spray head 104 by snap-fit connection to the mounting plate 144. It should be noted that the fingers 318 may allow the engine 126 to rotate relative to the mounting plate 144, so as to allow the user to selectively change the mode of the showerhead 100. However, the lips 320 prevent the engine 126 from separating from the mounting plate 144, even under water pressure.

With reference to FIGS. 2, 4, and 5, once the engine 126 is connected to the mounting plate 144, the nozzle ring 154 is received into the cover 150 and the individual rubber nozzles are inserted into respective nozzle apertures 178. In some embodiments only certain modes may include rubber nozzles and in these embodiments, the nozzle ring 154 may correspond to a particular mode. However, in other embodiments, every mode may have rubber nozzles and/or may be associated with the nozzle ring. In embodiments where the nozzles are formed through the rubber nozzle ring 154, the nozzles may be more easily cleaned. For example, during use, the nozzles may be become clogged with sediment or calcification of elements from the water supply source. With rubber nozzles, the nozzles can be deformed or bent to break up the deposits and which are flushed out of the nozzles, whereas with non-flexible nozzles, the nozzles may have to be soaked in a chemical cleaning fluid or cleaned through another time consuming process.

With reference to FIGS. 2, and 4-6B, the cover 150 may be secured to the engine 126. In particular, the face plate 148 is positioned within the cover chamber 172 with the respective nozzle groups aligning with the respective nozzle apertures in the cover 150. The alignment brackets 174 are connected to the face plate 148 as the locking tabs 208, 210 are received through the bracket apertures 176 in the cover 150. The locking tabs 208, 210 connect the engine 126 to the cover 150 so that as the cover 150 is rotated, the engine 126 will rotate correspondingly. For example, as a user turns the mode selector 118, the alignment brackets 174 will engage the tabs 208, 210 to move the engine 126 along with the cover 150.

With reference to FIGS. 2 and 3, the regulator 160 and filter 162 may be received at the threaded end 106 of the handle 102 and secured to the handle 102. Once the cover 150 is secured to the engine 126 (and thereby to the spray head 104), and the filter 162 and regulator 160 (if included) are connected, the showerhead 100 is ready to be connected to a water supply, e.g., J-pipe or other fluid source, and be used.

Operation of the Showerhead

The operation of the showerhead 100 will now be discussed in more detail. With reference to FIGS. 2-4, water enters the showerhead 100 through the inlet 108 in the handle 102 or, in instances when the showerhead 100 is a fixed or wall mount showerhead, directly through an inlet to the spray head 104. As the water enters, the water travels through the inlet conduit 172 to the spray head chamber 175. The spray head chamber 175 is fluidly connected to the engine inlet 336 in the mounting plate 144. The fluid flows through the engine inlet 336 and through the mode select aperture 410 of the mode seal 128 that is aligned with the engine inlet 336. The fluid path of the water after it flows through the mode select aperture 410 depends on the alignment of the engine 126, in particular the back plate 146, with the mode selection assembly 408.

For example, during a first mode, such as a fully body spray mode, the mode seal 128 may be aligned such that the mode select aperture 410 is positioned directly over the second mode aperture 286 of the back plate 146. Fluid flows through the mode select aperture 410, through the second mode aperture 286 and into the first mode channel 396. The sealing material of the mode seal 128 prevents fluid from flowing into other mode channel apertures. From the first mode channel 396, the fluid exits through the outlets 200 in the face plate 148 and into the rubber nozzles of the nozzle ring 154 and out through the cover 150.

During a second mode, such as a mist mode, the engine 126 is rotated via the mode selector 118 to a position where the mode seal 128 is aligned with the first mode aperture 284. In this example, the mode select aperture 410 of the mode seal 128 is aligned directly with the first mode aperture 284 to fluidly connect the spray head chamber 175 with the upper second mode channel 404. As water flows into the upper second mode channel 404, the water flows through first apertures 254 in the inner plate 158 into the second mode channel 398. From the second mode channel 398, the fluid flows around the mist plugs 418 into the nozzle chamber 226. The shape of the mist plugs 418 causes the water to spin, prior to exiting the mist outlets 422. The spinning of the water causes a misting spray characteristic where the water appears as a fine mist and the droplets are reduced in size.

During a third mode, such as a focused spray, the engine 126 is rotated so that the mode select aperture 410 of the mode seal 128 is aligned with the fourth mode aperture 290. In this example, the fluid flows from the spray head chamber 175 through the fourth mode aperture 290 into the upper third mode channel 406. The fluid flows into the third mode channel 400 by flowing through the second apertures 256 in the inner plate 158. Once in the third mode channel 400, the fluid exits the showerhead through the second group of nozzles 114 of the face plate 148.

During a fourth mode, such as a massage mode, the engine 126 is rotated so that the mode select aperture 410 of the mode seal 128 is aligned with the third mode aperture 288 of the back plate 146. Fluid flows from the spray head chamber 175 into the fourth mode channel 402. Once in the fourth mode channel 402, the fluid impacts the jet plate 164. With reference to FIGS. 4, 10, and 11, as the water impacts the jet plate 164, the water enters the inlet apertures 366 and optionally the pressure apertures 362. As the water flows through the inlet apertures 366, it impacts the blades 368 of the turbine 166. As the water hits the blades 368 of the turbine 166, the turbine 166 spins around the pin 168, which is secured to the face plate 148.

Figure 16A:
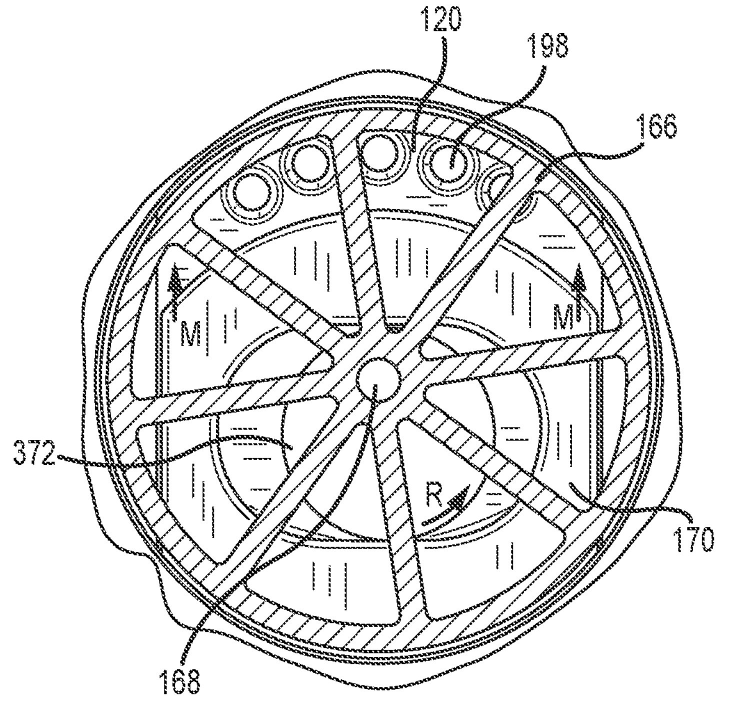
FIG. 16A is an enlarged cross-section view of the massage mode assembly with the shutter in a first position.
Figure 16B:
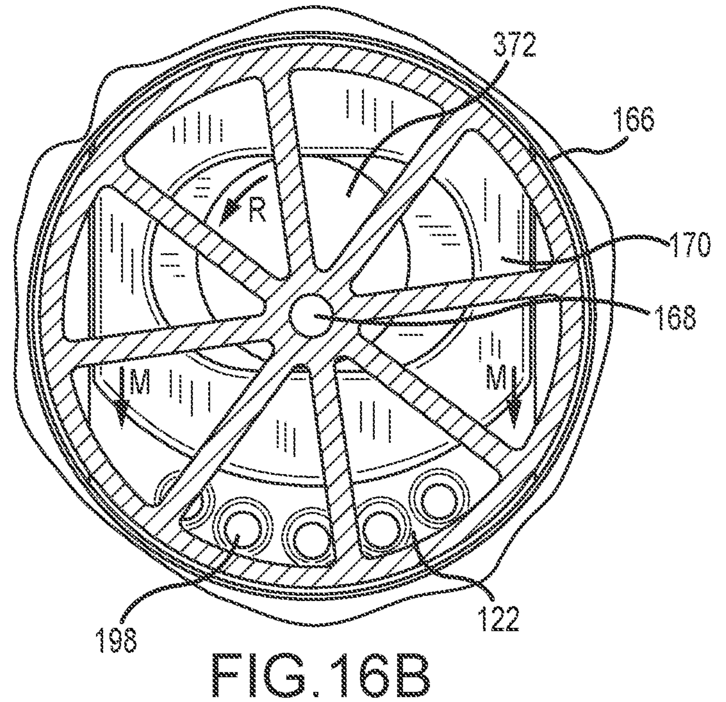
FIG. 16B is an enlarged cross-section view of the massage mode assembly with the shutter in a second position.

FIG. 16A is an enlarged cross-section view of the showerhead 100 illustrating the shutter 170 in a first position. FIG. 16B is an enlarged cross-section view of the showerhead illustrating the shutter 170 in a second position. With reference to FIGS. 4, 10-12, and 16A-16B, as the turbine 166 rotates, the cam 372 moves correspondingly. As the cam 372 is rotated, the cam 372 abuts against the interior sidewall 386 of the shutter 170 and moves the shutter 170. Due to the eccentricity of the cam 372, the shutter 170 moves around a center axis of the turbine 166. However, the movement of the shutter 170 is constrained by the curb walls 222 as they engage the constraining edges 388 of the shutter 170. As such, as the cam rotates 372 the shutter 170 is moved substantially linearly across the massage chamber 220in a reciprocating pattern. In particular, the curb walls 222 restrict the motion of the shutter 170 to a substantially linear pathway.

For example, as shown in FIG. 16A, as the cam 372 rotates in the R direction, the shutter 170 moves in the linear movement M direction across the massage chamber 220. In this position, fluid flows from the jet plate 164 through the open spaces between each of the turbine blades 368, past the shutter 170 to the first nozzle bank 120. Due to the substantially linear motion of the shutter 170, each of the massage outlets 198 in the first bank 120 open substantially simultaneously. Water exits the face plate 148 through the first bank 120 at substantially the same time.

With reference to FIG. 16B, as the turbine 166 continues to rotate, the cam 372 continues to move in the R direction, which causes the shutter 170 (due to the curb walls 222) to move substantially in the linear movement direction M, but toward the opposite sidewall of the massage chamber 220. As the shutter 170 moves to the second position, each of the nozzles of the first bank 120 are covered at substantially the same time and each of the nozzles of the second bank 122 are uncovered or opened at substantially the same time. This causes the water flow through each outlet 198 in a particular nozzle bank 120, 122 to start and stop simultaneously, creating a "hammer" or more forceful effect. That is, rather than the outlets 198 in a particular nozzle bank 120, 122 opening and closing progressively, as is done in conventional massage mode showerheads, the nozzle banks 120, 122 operate in a binary manner where each bank 120, 122 is either "on" or "off" and in the "on" state every outlet is open and in the "off" state every outlet is closed.

The intermittent opening and closing of the outlets in each nozzle bank 120, 122 creates a massaging spray characteristic. In particular, the water flows out the first bank 120 and the flows out the second bank 122 and as it impacts a user creates a forceful hammer type effect. The water flow is instantly started and stopped, which creates a more powerful massaging effect. The binary effect allows the massage force to feel more powerful, which allows the showerhead 100 to use a reduced water flow rate and still produce a massaging experience that replicates showerheads with an increased water flow rate.

As briefly described above, the user can selectively change the mode of the showerhead 100 by rotating the mode selector 118. With reference to FIG. 4, as the user rotates the mode selector 118, the cover 150 engages the tabs 208 on the face plate 148 and rotates the engine 126 therewith. As the engine 126 rotates within the spray head 104, the back plate 146 rotates relative to the mode seal 128 and plunger 142.

As the back plate 146 rotates, the force of the user overcomes the spring force exerted by the spring 140 on the plunger 142 and the biasing members 134, 136 to move the back plate 146. As the user rotates the mode selector 118, the plunger 142 compresses the spring 140 and disengages from a first detent recess 292. When the back plate 146 has been sufficiently rotated to reach a second detent recess 292, the spring 140 biases the plunger 142 into the detent recess 292. This allows a user to receive feedback, both haptically and optionally through a clicking or mechanical engagement sound, so that the user will know that he or she has activated another mode. In one embodiment, as will be discussed below, the mode seal 128 may be positioned to span across two mode apertures 284, 286, 288, 290 so that two modes of the showerhead 100 may be activated at the same time. In this embodiment, the back plate 146 may include a detent recess 292 for every separate mode and every combination mode, i.e., for four discrete modes there may be seven detent recesses. However, in other embodiments, the combination modes may not have detents associated therewith and/or there may be fewer or more detents and modes for the showerhead.

Additionally, as the back plate 146 rotates due to the user's rotation of the mode selector 118, the mode seal 128 is positioned at various locations along the back plate 146. The mode seal 128 may directly align with one or more of the mode apertures 284, 286, 288, 290 to activate a single mode. Alternatively, the mode seal 128 may be positioned such that the mode select aperture 410 is fluidly connected to two of the mode apertures 284, 286, 288, 290. For example, the mode seal 128 may be positioned between two of the apertures so that a portion of each aperture is sealed and a portion is opened. In this configuration, the water may flow through two mode apertures 284, 286, 288, 290 simultaneously, activating two modes of the showerhead 100 at the same time. The combination modes may be limited to the modes having mode apertures 2984, 286, 288, 290 positioned adjacent to one another or, in other embodiments, the seal 128 may be varied or the showerhead may include two or more mode seals which may allow for the showerhead 100 to activate two or more modes that do not have mode apertures adjacent one another.

In an embodiment where the back plate 146 includes the stop bump 294 received into the stop cavity 344 of the mounting plate 144, the stop bump 294 may rotate within the stop cavity 344 as the user rotates the engine 126. The stop cavity 344 may be configured to provide a "hard stop" to the user to limit the range that the mode selector 118 can rotate. In particular, the rotation may be determined by the arc length of the stop cavity 344. As the engine 126 is rotated by the mode selector 118, the stop bump 294 travels within the cavity 344 until it reaches an end of the cavity 344. Once the stop bump 294 reaches an end of the cavity 344, the engagement of the stop bump 294 against the cavity walls prevents the user from further rotating the mode selector 118. The hard stop helps to prevent damage to the showerhead 100 as a user cannot over-rotate the mode selector 118 past a desired location. Additional Embodiments In some instances, an increased force intensity and pulse length may be desired, e.g., to enhance a user experience and/or to increase force to compensate for reduced water flow rates. In these instances, the massage mode assembly may be varied to change a pulse time and waveform, generating a more intense and sharper water pulse. In these instances, the massage mode assembly is configured to allow the shutter to "dwell" or be retained within the first position and the second position for a period of time, increasing the length of water pulses through one or more nozzles associated with the first position and the second position. In one example, the cam may be configured to have a discontinuous or non-circular outer surface that includes one or more corners and/or distinct edge surfaces. For example, the cam may include a tri-lobe configuration defining a leading edge, a dwell edge, and a follower edge, where one or more of the edges may be separated by distinct corners or vertices, such as a first or leading corner and a second or follower corner. The different edges cause the shutter to initiate movement, dwell in a position, and then transition, where the transition time may be less than the dwell time in the first and second position, which increases the pulse time for a set of nozzles in fluid communication with the inlet during the first position or the second position.

Figure 17A:
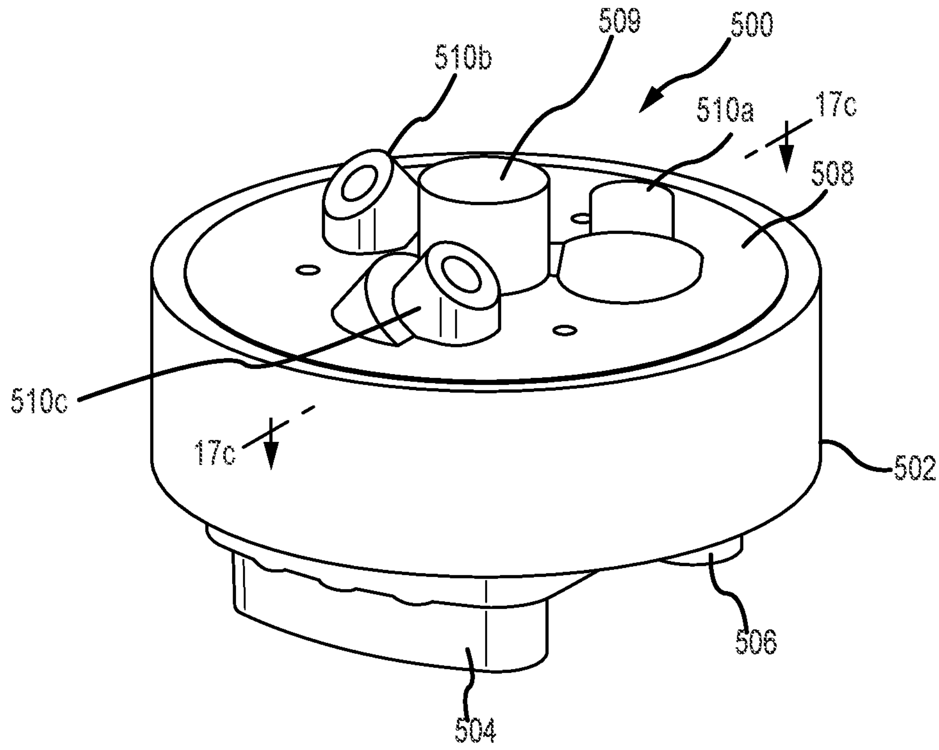
FIG. 17A is a front isometric view of another embodiment of a massage mode assembly.
Figure 17C:
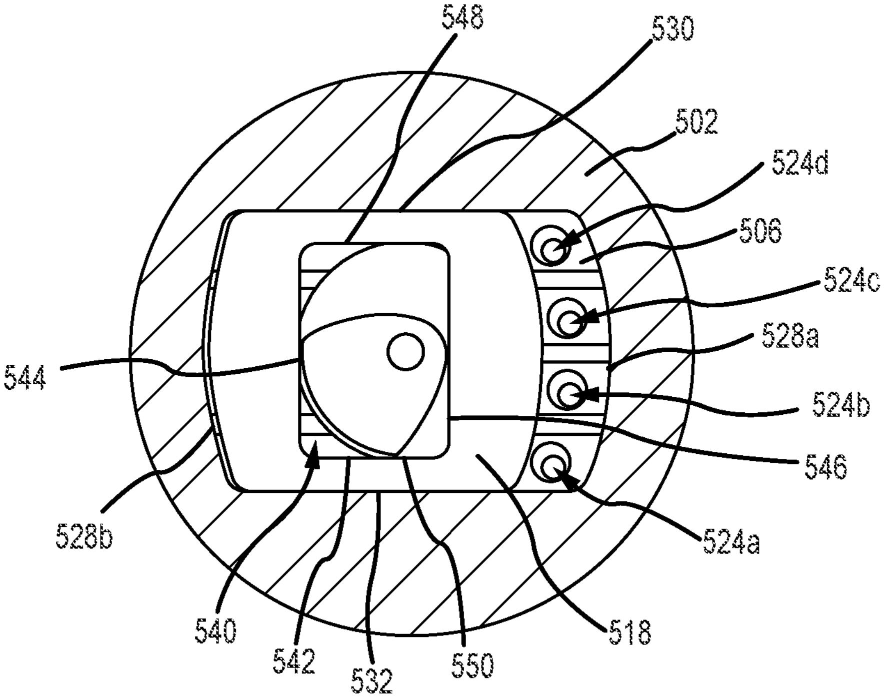
FIG. 17C is a cross-section view of the massage assembly taken along line 17C-17C in FIG. 17A.
Figure 17B:
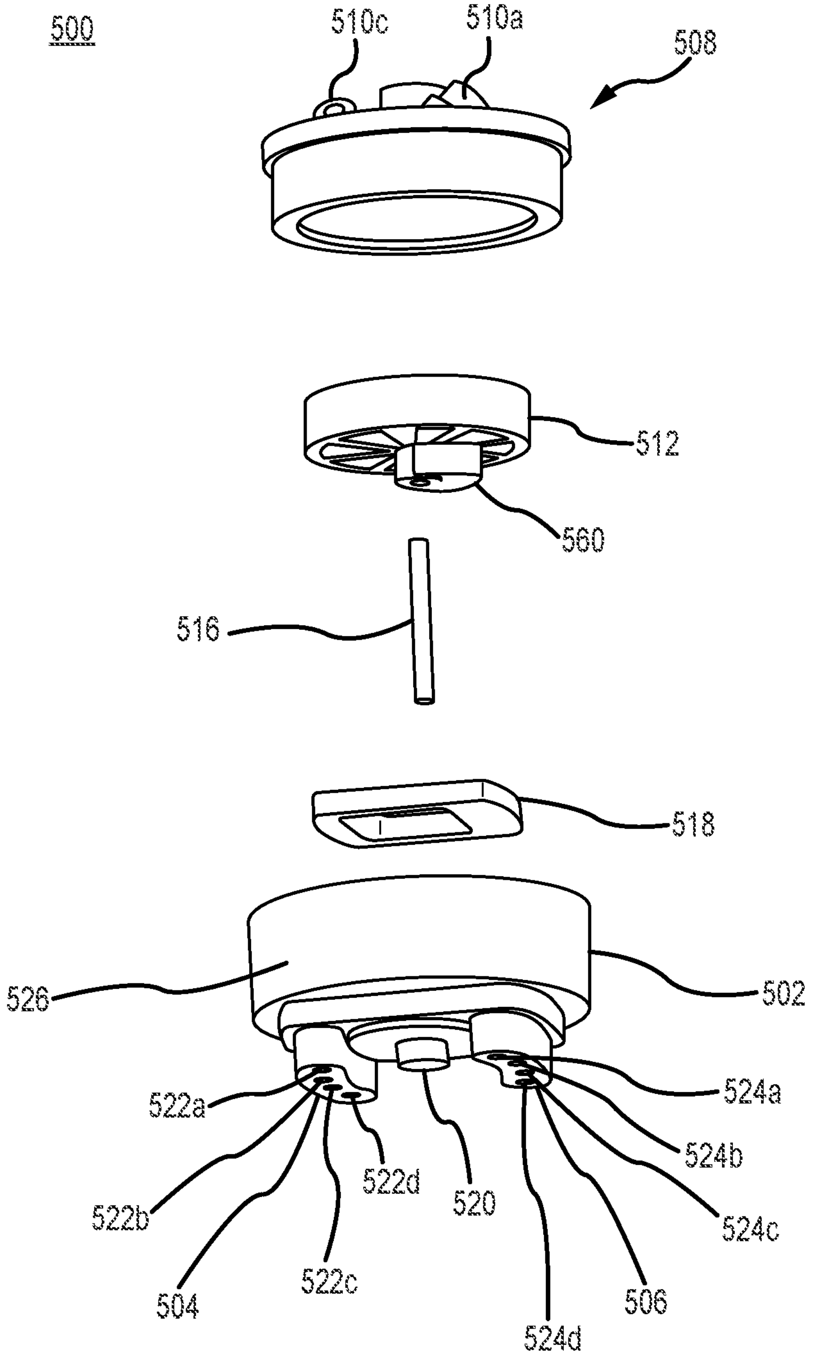
FIG. 17B is an exploded view of the massage mode assembly of FIG. 17A.

FIGS. 17A-17C illustrate various views of a massage mode assembly 500. It should be noted that any features not specifically discussed may be the same or similar to those shown and discussed above with respect to FIGS. 1-16B. Further, it should be appreciated that the massage mode assembly 500 may be integrated into the showerhead 100, such as being positioned within the engine.

The massage mode assembly 500 may include a massage chamber 502, which may be defined as a separate compartment or as part of the face plate 148. The massage chamber 502 is shown as a separate component in FIG. 17A-17C, but in many instances may be formed as the third ring wall 234 in the face plate 148. The massage chamber 502 may be defined as an outer wall 526, which may be the same as the third ring wall 234 and is in fluid communication with the water inlet and is configured to receive other components of the massage mode assembly 500.

Two or more nozzle banks 504, 506 may be defined on a bottom surface of the massage chamber 502, which may each include one or more nozzles. For example, the first nozzle bank 504 may include nozzles 522*a*, 522*b*, 522*c*, 522*d* and nozzle bank 506 may include nozzles 524*a*, 524*b*, 524*c*, 524*d*. Nozzle banks 504, 506 may be the same or substantially the same as nozzle banks 120, 122. It should be noted that while the nozzle banks 504, 506 are illustrated as being arcuate or crescent shaped, in other configurations, the nozzle banks 504, 506 may be differently configured, such including aligned nozzles, such as to form adjacent parallel straight banks of the nozzles.

A nub 520 may be defined on a bottom surface of the massage chamber 502 and may be similar to nub 196. For example, the nub 520 may be defined as a recessed portion of the bottom wall of the massage chamber 502 and may be positioned between the two nozzle banks 504, 506.

With reference to FIG. 17C, the massage chamber 502 may include walls that define a track, which may include two curb walls 530, 532 and two end walls 528*a*, 528*b*. In one embodiment, the end walls 528*a*, 528*b* may be slightly arcuately shaped, such as convexly curved and may correspond to a shape of the nozzle banks 504, 506. However, in other embodiments, the end walls 528*a*, 528*b* may be differently shaped, such as parallel straight walls or the like. The curb walls 530, 532 may be parallel to one another and extend between the end walls 528*a*, 528*b*. Similar to curb walls 222, the curb walls 530, 532 may act to restrain or define motion of the shutter as will be discussed in more detail below. The curb walls 530, 532 may be formed integrally via the shape of the massage chamber 502 (e.g., the entire chamber may be formed to have a shape of the curb walls 530, 530) or may be separately extending portions, such as edges that protrude from an interior wall of the massage chamber 502.

The massage mode assembly 500 may also include a jet plate 508 that defines one or more inlets 510*a*, 510*b*, 510*c*. The jet plate 508 may be substantially similar to the jet plate 164 and include one or more inlet jets 510*a*, 510*b*, 510*c* that may be similar to inlet jets 354, 356, 358 that are in fluid communication with a water source, such as the engine inlet or the like. A nub 509 may be defined as a extending portion on the top surface of the jet plate 508 and define a recessed pocket on the interior surface of the jet plate 508.

A pin 516, which may be substantially similar to pin 168, may be included in the massage mode assembly 500. The pin 516 may define a rotational axis for the turbine and be configured to be secured in the massage chamber 502 and the jet plate 508 as discussed in more detail below.

With reference to FIG. 17B and 17C, a shutter 518 may form a portion of the massage mode assembly 500. The shutter 518 may be somewhat similar to the shutter 170 or shoe described above. However, the shutter 518 may have a differently shaped cam aperture 540. For example, cam aperture 540 may be configured to increase a dwell time for the shutter 518 and may have a generally rectangular shape. In a specific implementation, the cam aperture 540 may be defined by an interior wall 542 which may have multiple lengths, such as two end edges or walls 544, 546 that are parallel to one another and two side edges or walls 548, 550 that are parallel to one another and perpendicular to the end edges 544, 546. In this manner, there may be four walls, e.g., a first edge 544, a second edge 548, a third edge 546, and a fourth edge 550. In some embodiments, the end edges 544, 546 extend across a width of the shutter 518 and the side edges 548, 550 extend along a length of the shutter 518 and in some in instances the end edges 544, 546 may have a longer length than the length of the side edges 548, 550.

Figure 19A:
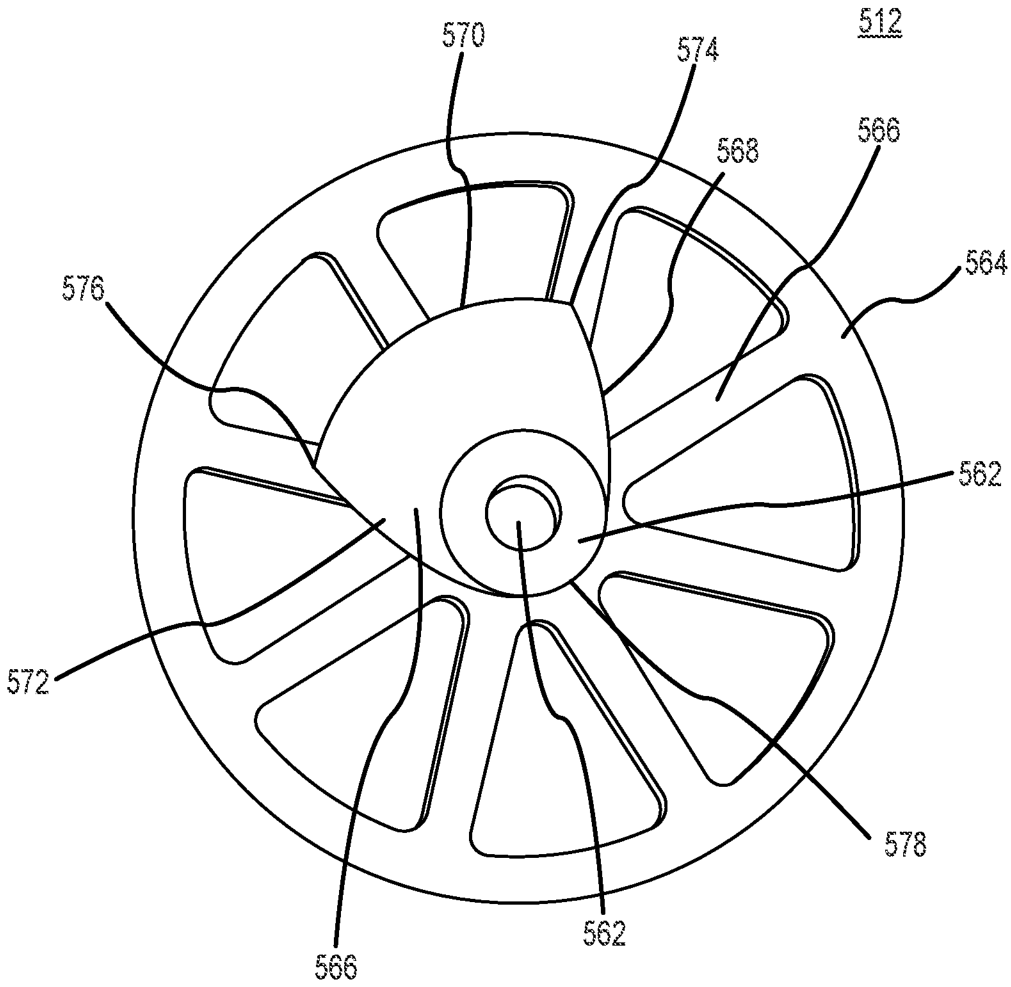
FIG. 19A is a bottom plan view of a turbine including a cam for a massage mode assembly.
Figure 19B:
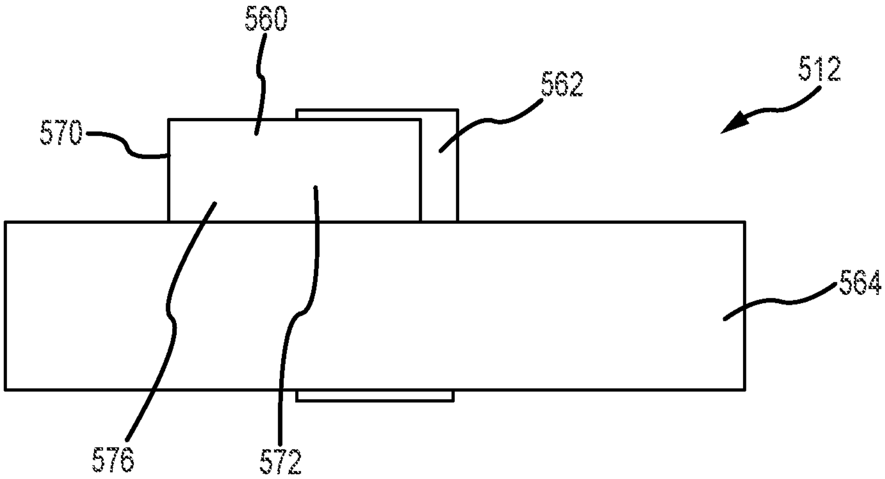
FIG. 19B is a side elevation view of the turbine and cam of FIG. 19A.

A turbine 512 may be used to drive the shutter 518 within the massage chamber 502. FIGS. 19A and 19B illustrate various views of the turbine 512. With reference to FIGS. 19A and 19B, the turbine 512 may include a plurality of blades 566 that receive a water impact force to rotate the turbine 512. The blades 566 may extend radially outwards from a central hub 562 that may define a center of the turbine 512. The blades 566 may be spaced apart from one another as they extend from the outer surface of the central hub 562. In some embodiments, a distal end of the blades 566 may be coupled to a turbine outer wall 564. For, example, as shown in FIG. 19A, the turbine outer wall 564 may define the outer periphery of the turbine 512 and extend between the blades 566. In other embodiments, the blades 566 may have free distal ends (see, e.g., FIG. 22).

A pin aperture 562 may be defined through a center of the central hub 562 and may be aligned with a center axis of the turbine 512. The pin aperture 562 may extend through the entire central hub 562 and be configured to receive the pin 516 therethrough.

A cam 560 extends from a bottom or second side of the turbine 512. The cam 560 may be defined integrally with the turbine 512 or may be a separate component coupled thereto, but in either implementation is configured to be rotated along with movement of the turbine 512. The cam 560 may extend from the central hub 562. In some embodiments, the cam 560 is configured to increase a dwell time of the shutter 518 as compared to other embodiments and may have a discontinuous or non-circular outer surface. For example, the cam 560 may include two or more distinct edges around the outer surface thereof.

In one embodiment, the cam 560 may include a leading edge 568 that may be defined as an outwardly curved surface originating at a bottom transition point 578 on the central hub 562 and terminating at a first or leading corner 574 or vertex. A dwell edge 570 may extend from the leading corner 574 and while also being convexly curved, may extend at an angle, such as between 30 and 160 degrees relative to the leading edge 568 and optionally may be 120 degrees. The dwell edge 570 may terminate at a second or follower corner 576 or vertex and a follower edge 572 may extend at an angle relative to the dwell edge 570 from the follower corner 576. For example, the dwell edge 570 and the follower edge 572 may be oriented at an angle between 30 and 160 degrees relative to one another and optionally at 120 degrees. The follower edge 572 may extend from the follower corner 576 to the transition point 578, which may be defined as a point on the outer surface of the central hub 562. In these instances, the cam 560 may define a tri-lobe or three lobed surface that has different distinct surfaces as compared to the cam 372 in FIG. 12. The orientation and curvature of the different lobes, e.g., the leading edge 568, dwell edge 570, and follower edge 572, may be varied depending on the desired transition and torque application. For example, the curvature of the leading edge 568 may be configured to generate a smooth transition for the shutter 518 as it transitions from a substantially stationary position (e.g., a first position or second position), to moving, such as to move towards the opposite position.

In one embodiment, a corner to corner angle of the dwell edge 574 may be approximately 90 degrees as determined from the leading corner 574 to the follower corner 576. This corner to corner angle may correspond to the degrees of rotation by the cam 560 that retain the shutter 518 in a fixed position as discussed in more detail below. In instances where an increased dwell time may be desired, the angular extension of the dwell edge 570 can be increased (e.g., the corner to corner angle). In these instances, the shutter 518 motion may be more abrupt, which may enhance the pulses output by the showerhead, but may require an increased torque applied by the turbine 512.

In some embodiments, the leading edge 568, dwell edge 570, and follower edge 572 may have approximately the same perimeter length and curvature and may be defined as a reuleaux triangle, except that the bottom or third point may be rounded and defined as a tangential point on the central hub 562 rather than an extending corner. In these embodiments, the cam 560 may have a constant width, such that all points on a particular side edge may be equidistance from the opposite vertex or corner 572, 576. As a specific example, the points along the leading edge 568 may be equidistant from the follower corner 576 and the points along follower edge 572 may be equidistant from the leading corner 574.

With reference to FIG. 17B and 17C, the massage mode assembly 500 may be assembled together such that the shutter 518 is coupled to the cam 560. For example, the cam 560 may be received within the cam aperture 540 and a portion of the interior wall 542 of the shutter 518 may engage the outer surface of the cam 560. The turbine 512, cam 560, and shutter 518 may then be positioned in the massage chamber 502 with the shutter 518 aligned such that its longitudinal edges extend parallel to the curb walls 530, 532 of the massage chamber 502. In this manner, the two sides edges 548, 550 of the cam aperture 540 may be parallel to the curb walls 530, 532 and the end edges 544, 546 may extend in generally the same direction as the end walls 528*a*, 528*b*.

The pin 516 may be inserted in to the pin aperture 562 of the turbine 512 and its first end received within the nub 520 on the bottom surface massage chamber 502. The jet plate 508 may be coupled to the top end of the massage chamber 502 and the second end of the pin 516 may be received within a corresponding nub 509 on the jet plate 508. The nubs 509, 520 act to secure the pin 516 in place, such that the turbine 512 may rotate around the pin 516, e.g., the pin 516 defines a rotational axis of the turbine 512 and cam 560.

The massage mode assembly 500 may operate in a similar manner to the massage mode assembly 152, but may generate a more distinct and/or forceful water pulse. Specifically, as water enters into the massage chamber 502 through the jet plate 508 and specifically the jet inlets 510*a*, 510*b*, 510*c* (such as from the spray head chamber 175), the water impinges the blades 566 on the turbine 512. The impingement causes the turbine 512 to rotate about the pin 516. As the turbine 512 rotates, the cam 560 engages the shutter 518 and causes the shutter 518 to move in a substantially linear fashion within the massage chamber 502 being a first position where a body of the shutter 518 blocks the second nozzle bank 506 and opens the first nozzle bank 504 to a second position where the body of the shutter 518 blocks the first nozzle bank 504 and opens or uncovers the second nozzle bank 506. Due to the discontinuous outer surface of the cam 560, the shutter 518 may act to pause in each of the first position and the second position before transitioning to the other surface. For example, the shutter 518 may remain substantially in the first position or second position respectively (sufficient to block the respective nozzle banks 504, 506) for at least 10 degrees of rotation of the cam and up to 180 degrees of rotation of the cam 560. Depending on tolerances of the massage mode assembly, there may be some minimal movement of the shutter 518 within the chamber 502 while in the first position, but such movement, may be insufficient to allow water to reach the covered nozzles. In many cases, the shutter 518 may be configured to remain in the first position or second positon and not move until the transition to the next position begins.

In some instances, the angular expansion of the dwell edge 570, e.g., the distance between the leading corner 574 and the follower corner 576, may define in part the time period in which the shutter 518 is held in the first position or the second position, respectively. For example, in a specific embodiment, the dwell edge 570 may define a 90 degree corner to corner span and in this example and the shutter 518 may remain fixed or locked in the first position or the second positon for approximately 90 degrees. The shutter 518 may remain in the first position or second position for additional time, e.g., sufficient to block flow to the respective nozzle bank 504, 506, but may begin to move slightly (e.g., initiate a transition) for another 20 degrees. As a specific example, the shutter 518 may be configured to remain blocking the respective nozzle bank 504, 506 for more than 10 degrees of rotation and in one option for 110 degrees of rotation. This may be compared to the circular cam in other embodiments, that may maintain the shutter in a blocking position for 10 degrees of rotation or less.

Figure 20A:
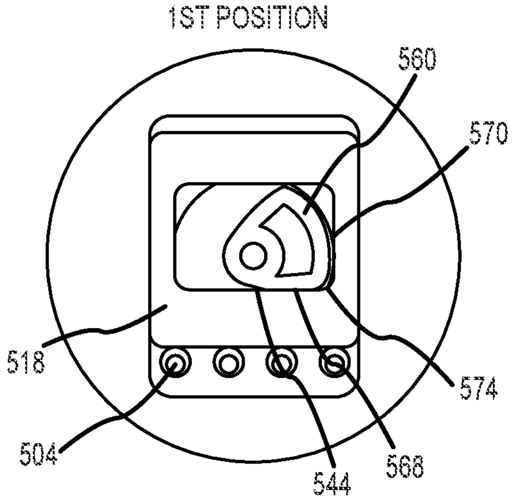
FIG. 20A is a cross-section view of a massage mode assembly with a shutter in a first position.

FIGS. 20A-20F illustrate various positions of the cam 560 and shutter 518 as the shutter 518 moves within the massage chamber 502. With reference to FIG. 20A, in a first position, the shutter 518 is positioned over the second nozzle bank 506, fluidly disconnecting the nozzles 524*a*, 524*b*, 524*c*, 524*d* from the fluid inlet and opens or fluidly couples the first nozzle bank 504 and its nozzles 522*a*, 522*b*, 522*c*, 522*d* to the fluid inlet. In this position, fluid exits from the massage chamber 502 through the nozzles 522*a*, 522*b* 522*c*, 522*d* of the first nozzle bank 504. As the turbine continues to rotate, the leading edge 568 of the cam 560 is rotated to engage against the end wall 544 of the interior wall 542 of the shutter 518. This engagement initiates a movement of the shutter 518 to move the shutter 518 from the first position.

Figure 20B:
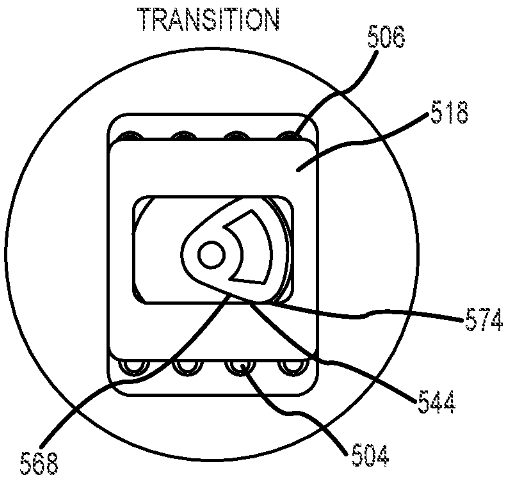
FIG. 20B is a cross-section view of a massage mode assembly with a shutter transitioning from the first position to a second position.

With reference to FIG. 20B, after engagement by the leading edge 568 of the cam 560, the leading corner 574 is rotated to engage against the end wall 544 of the shutter 518. The leading corner 574 pushes the shutter 518 into the second position. It should be noted that in some instances, the cam 560 and cam aperture 540 of the shutter 518 may be configured such that the cam 560 does not impact or engage the side edges 548, 550 of the shutter 518 as it rotates, rather engaging only the end edges of the interior wall 542, which may help maintain the shutter 518 in a desired position.

Figure 20C:
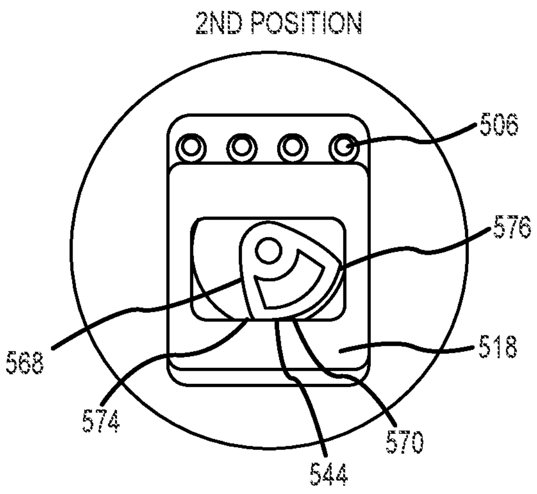
FIG. 20C is a cross-section view of a massage mode assembly with a shutter in a second position.
Figure 20D:
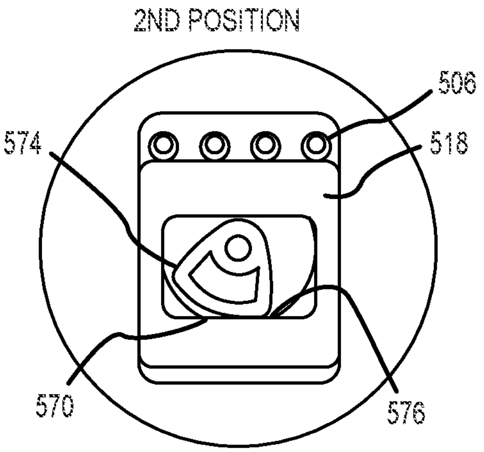
FIG. 20D is a cross-section view of a massage mode assembly with a shutter in a second position at a different point in time as compared to FIG. 20C.

With reference to FIG. 20C, in the second position, the shutter 518 covers the first nozzle bank 504, fluidly decoupling the nozzles 522*a*, 522*b*, 522*c*, 522*d* from the fluid inlet and uncovering or opening the second nozzle bank 506, fluidly coupling nozzles 524*a*, 524*b*, 524*c*, 524*d* to the fluid inlet. In this position, the shutter 518 is retained in the position as the cam 560 continues to rotate, causes the dwell edge 570 to brush against the end wall 544 of the shutter 518, exerting a retaining force on the shutter 518 to prevent the shutter 518 from rotating out of the second position. As shown in FIG. 20D, the shutter 518 maintains the second position as the cam 560 continues to rotate around as the dwell edge 570 continues to be oriented towards the end wall 544. It should be noted that in some embodiments, the dwell edge 570 may engage the end wall 544 and in other embodiments, such as based on tolerances or to allow ease or motion, the dwell edge 570 may not directly engage the shutter 518, but may prevent lateral movement of the shutter 518 towards the first position (e.g., act as a stop to prevent movement in the opposite direction).

Figure 20E:
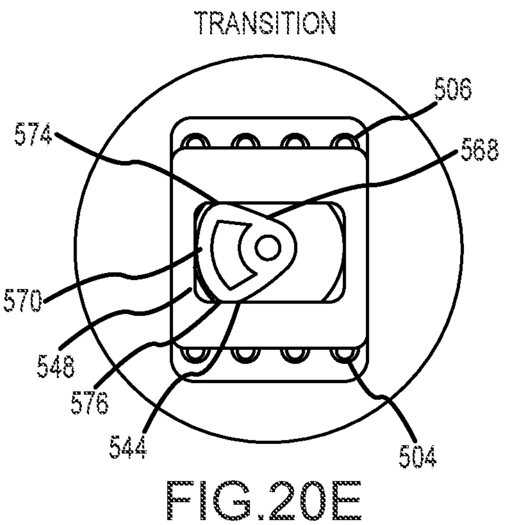
FIG. 20E is a cross-section view of a massage mode assembly with a shutter transitioning from the second position to the first position.
Figure 20F:
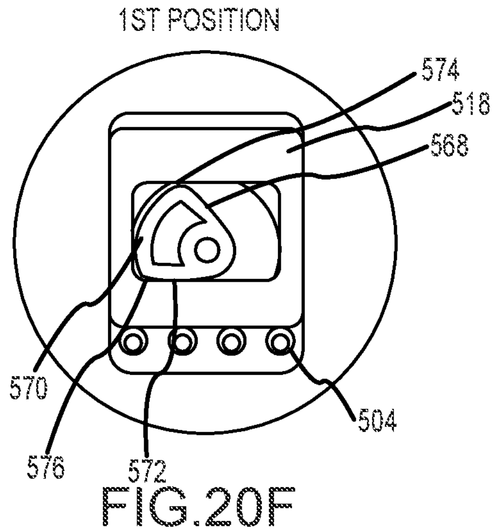
FIG. 20F is a cross-section view of a massage mode assembly with a shutter in a first position.

With reference to FIG. 20E, after the dwell edge 570 is rotated past the end wall 544 and towards the side edge 548, the shutter 518 may be free to move from the second position (e.g., released) and the cam 560 is positioned such that the leading edge 568 beings to abut against the opposite end wall or edge 546, initiating movement of the shutter 518 back to the first position. Then, as shown in FIG. 20F, the leading corner 574 may complete movement of the shutter 518 to the first positon and the dwell edge 570 may again act to maintain the shutter 518 in the position for a time period corresponding to a perimeter length of the dwell edge 570.

The dwell or pause time of the shutter 518 in the first position and the second position allows the first nozzle bank 504 and the second nozzle bank 506 to remain open or closed, respectively, for a longer period of time as compared to the massage mode assembly 152. This additional time, which may correspond to the length of the perimeter of the dwell edge 570, generates more forceful water pulses through the nozzles of the open nozzle banks 504, 506 and causes more distinctive pulses. In particular, at the same flow rate as the massage mode assembly 152, the massage mode assembly 500 may generate increased force as there may be fewer nozzles open at any given time, e.g., both nozzle banks 504, 506 may only be open together for a quick transition time, but otherwise, only one is either open or closed and the shutter 518 stays in the closed or open position along a larger number of degrees on the rotational path of the turbine 512 as compared to massage mode assembly 152. In some embodiments, massage mode assembly 152 may generate a sinusoidal wave for the position of the shutter as it moves within the massage chamber and the massage mode assembly 500 may generate a more square waveform for the shutter position, as the shutter pauses at the top or bottom of each wave, rather than quickly transitioning as in the sinusoidal waveform. Additionally, the transition time, e.g., the incline edge of the wave, may be steeper in the massage mode assembly 500 as compared to massage mode assembly 152, due to the faster transition time between first and second positions in the massage mode assembly 500.

Figure 21:
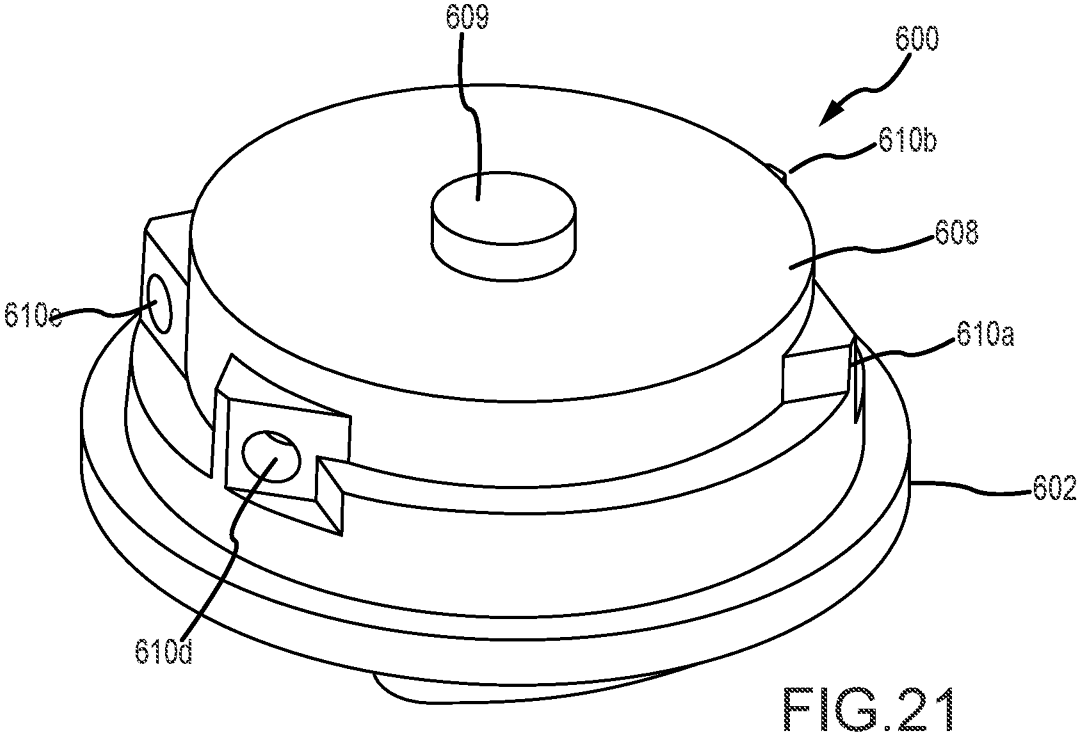
FIG. 21 is a top isometric view of another example of a massage mode assembly.
Figure 22:
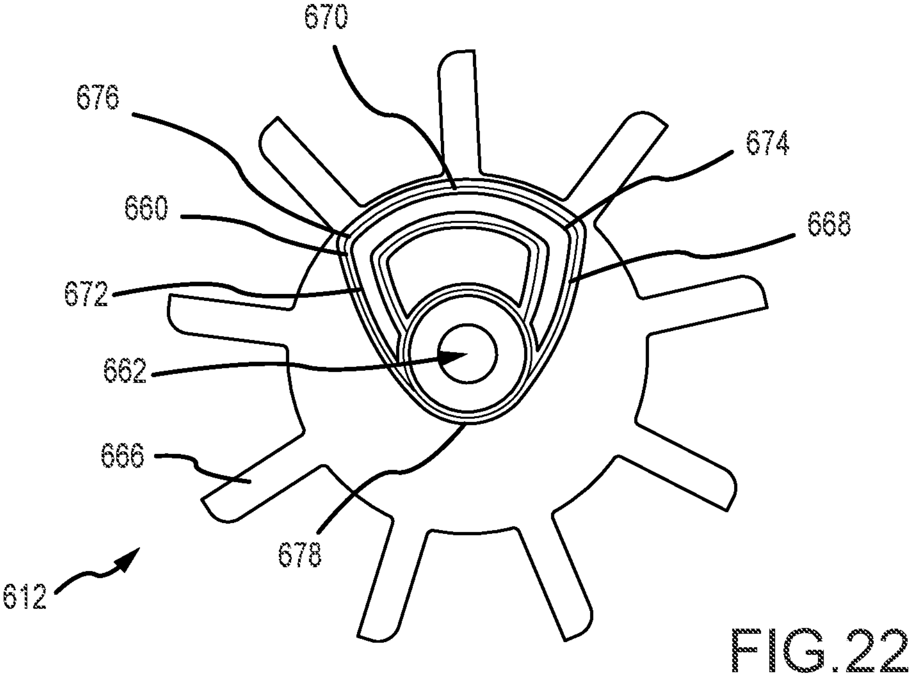
FIG. 22 is a bottom plan view of a turbine and cam for a massage mode assembly.
Figure 23:
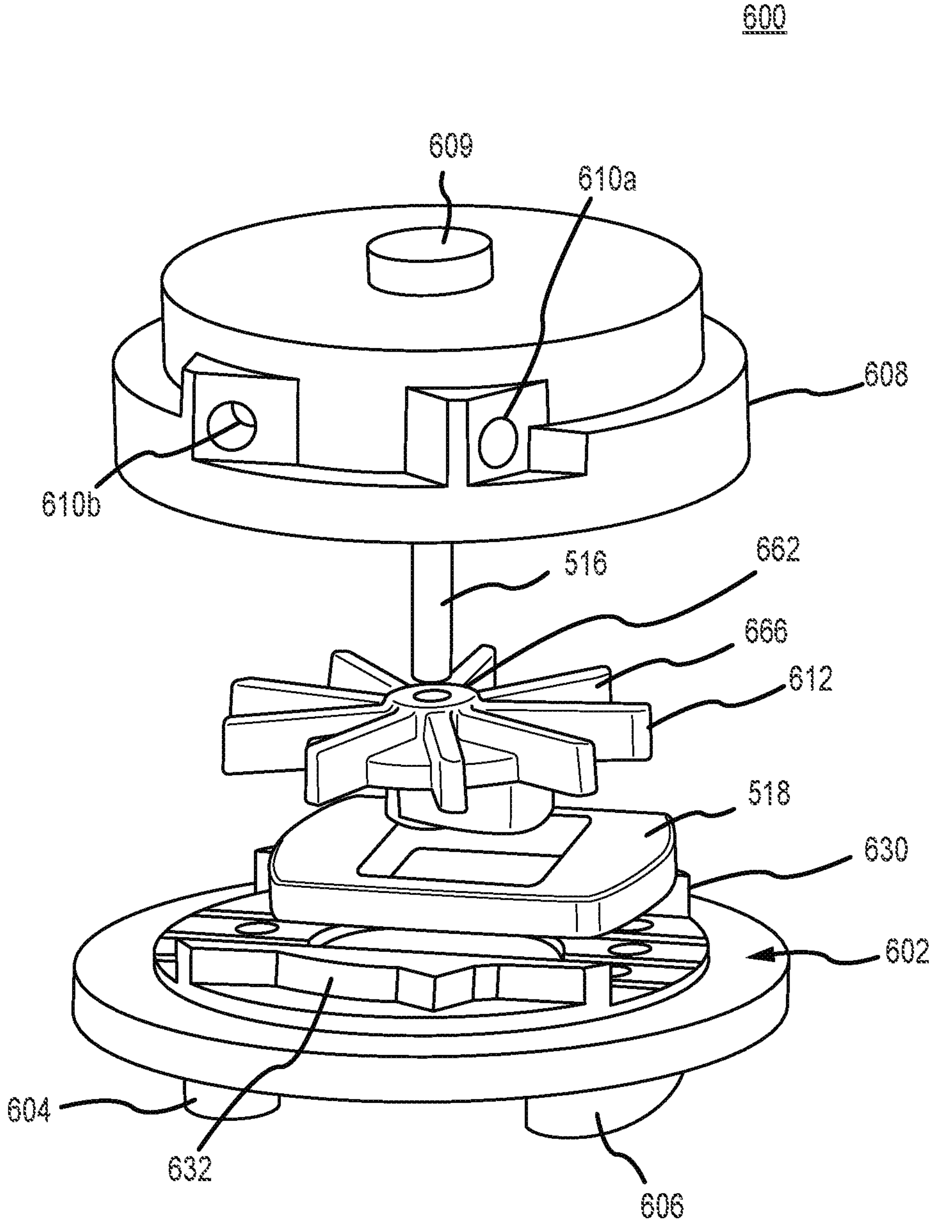
FIG. 23 is an exploded view of the massage mode assembly of FIG. 21.

In some embodiments, the massage mode assembly may be configured to receive water at a different orientation. FIGS. 21-23 illustrate another example of a massage mode assembly 600. This example may be substantially the same as massage mode assembly 500, but may include a tangentially oriented water inlets into the massage chamber 602. For example, with reference to FIGS. 21 and 22, the massage mode assembly 600 may include a jet cover 608 with one or more inlets 610*a*, 610*b*, 610*c*, 610*d* oriented on an outer side wall of the jet cover 608, rather than on a top surface as shown in the jet plate 508. In the jet cover 608, the inlets 610*a*, 610*b*, 610*c*, 610*d* may be defined around the outer circumference or periphery of the jet cover 608 and configured to direct water at a tangential orientation to the turbine 612. In some embodiments, the jet cover 608 may include additional inlets, such as four inlets 610*a*, 610*b*, 610*c*, 610*d*, which may help to provide a more constant flow into the massage chamber 602 as compared to an odd number of inlets (e.g., three inlets in jet plate 608).

Additionally, in this example, the turbine 612 may include free blades 666. For example, as shown in FIGS. 22 and 223, the blades 666 may radiate outwards from a central hub 662, similar to the turbine 512, by the outer wall 564 may be omitted, such that the blades 666 may have free distal ends. Optionally, as shown in FIG. 23, in this example, a cam 660 may include a hollow center portion, which may assist in manufacturing (e.g., ease of molding) as well as may allow a lighter weight for the turbine 612. For example, the cam 660 may include the same outer surfaces, e.g., leading edge 668, dwell edge 670, and follower edge 672, as well as a leading corner 674, a follower corner 676, and a transition point 678, but the interior mass of the cam 660 may be hollowed or partially recessed.

Similarly, the massage chamber 602 may be configured to be defined in part with a wall of the jet cover 608 and may include a bottom plate that includes the curb walls 630, 632 and nozzle banks 604, 606 but otherwise a volume of the interior of the chamber 602 may be defined by other flow plates of the showerhead 100 engine and/or the jet cover 608.

In operation, the massage mode assembly 600 may be substantially similar to the massage mode assembly 500 and act to more the shutter 518 between first and second positions as described within respect to FIGS. 20A-20F, but the water from the inlet may be angled at the turbine 612 tangentially via the inlets 610*a*, 610*b*, 610*c*, 610*d*.

CONCLUSION

It should be noted that any of the features in the various examples and embodiments provided herein may be interchangeable and/or replaceable with any other example or embodiment. As such, the discussion of any component or element with respect to a particular example or embodiment is meant as illustrative only.

It should be noted that although the various examples discussed herein have been discussed with respect to showerheads, the devices and techniques may be applied in a variety of applications, such as, but not limited to, sink faucets, kitchen and bath accessories, lavages for debridement of wounds, pressure washers that rely on pulsation for cleaning, care washes, lawn sprinklers, and/or toys.

All directional references (e.g., upper, lower, upward, downward, left, right, leftward, rightward, top, bottom, above, below, vertical, horizontal, clockwise, and counterclockwise) are only used for identification purposes to aid the reader's understanding of the examples of the invention, and do not create limitations, particularly as to the position, orientation, or use of the invention unless specifically set forth in the claims. Joinder references (e.g., attached, coupled, connected, joined and the like) are to be construed broadly and may include intermediate members between the connection of elements and relative movement between elements. As such, joinder references do not necessarily infer that two elements are directly connected and in fixed relation to each other.

In some instances, components are described by reference to "ends" having a particular characteristic and/or being connected with another part. However, those skilled in the art will recognize that the present invention is not limited to components which terminate immediately beyond their point of connection with other parts. Thus the term "end" should be broadly interpreted, in a manner that includes areas adjacent rearward, forward of or otherwise near the terminus of a particular element, link, component, part, member or the like. In methodologies directly or indirectly set forth herein, various steps and operations are described in one possible order of operation but those skilled in the art will recognize the steps and operation may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A showerhead comprising:

a first nozzle;

a second nozzle; and a massage mode assembly in fluid communication with a fluid inlet, the first nozzle, and the second nozzle, the massage mode assembly comprising:

a turbine;

a cam coupled to the turbine defining a dwell edge that extends between a leading corner and a follower corner; and a shutter movably coupled to the cam, wherein movement of the turbine causes the cam to drive the shutter between a first position covering the first nozzle and opening the second nozzle and a second position opening the first nozzle and covering the second nozzle.

2. The showerhead of claim 1, wherein a length of the dwell edge determines a time period that the shutter remains in the first position and the second position.

3. The showerhead of claim 1, wherein the cam further comprises a leading edge extending from a first side of the leading corner, wherein the dwell edge extends from a second side of the leading corner, wherein to transition from the first position to the second position the leading edge engages the shutter to initiate movement from the first position to the second position and the leading corner completes the movement from the first position to the second position.

4. The showerhead of claim 3, wherein the dwell edge maintains the shutter in the first position until the leading edge initiates movement to the second position.

5. The showerhead of claim 3, wherein the dwell edge and the leading edge have a convex curvature.

6. The showerhead of claim 1, wherein the shutter comprises a cam aperture defined by an interior wall, wherein the wall comprises a first edge, a second edge perpendicular to the first edge, a third edge parallel to the first edge, and a fourth edge parallel to the second edge, wherein the cam contacts the first edge and the third edge to transition the shutter from the first position to the second position and does not contact the second edge or the fourth edge.

7. The showerhead of claim 1, wherein the massage mode assembly further comprises a massage chamber wherein the shutter is positioned within and moves relative to the massage chamber.

8. The showerhead of claim 7, wherein the massage chamber defines the first nozzle and the second nozzle and comprises a first curb wall and a second curb wall, wherein the first and second curb walls are parallel to one another and restrict movement of the shutter within the massage chamber.

* * * * *